(12) United States Patent  
Talwerdi

(10) Patent No.: US 8,542,094 B2  
(45) Date of Patent: Sep. 24, 2013

(54) APPARATUS AND METHOD FOR SECURE DETECTION OF AN ITEM AND A METHOD OF SECURING ACCESS TO INFORMATION ASSOCIATED WITH THE ITEM

(75) Inventor: Mehdi Talwerdi, North Vancouver (CA)

(73) Assignee: VeriChk Global Technology Inc., North Vancouver (CA)

( * ) Notice: Subject to any disclaimer, the term of this patent is extended or adjusted under 35 U.S.C. 154(b) by 632 days.

(21) Appl. No.: 12/441,714

(22) PCT Filed: Sep. 18, 2007

(86) PCT No.: PCT/CA2007/001686  
§ 371 (c)(1),  
(2), (4) Date: Mar. 17, 2009

(87) PCT Pub. No.: WO03/012412  
PCT Pub. Date: Feb. 13, 2003

(65) Prior Publication Data  
US 2010/0073128 A1   Mar. 25, 2010

Related U.S. Application Data

(60) Provisional application No. 60/845,901, filed on Sep. 19, 2006.

(51) Int. Cl.  
*G05B 23/00* (2006.01)  
*G06F 7/00* (2006.01)  
*G06K 9/00* (2006.01)  
*G06K 9/34* (2006.01)  
*G06K 9/74* (2006.01)

(52) U.S. Cl.  
USPC ........... 340/5.8; 340/5.81; 382/103; 382/173; 356/71

(58) Field of Classification Search  
USPC ............................................. 340/5.6; 356/71  
See application file for complete search history.

(56) References Cited

U.S. PATENT DOCUMENTS 4,514,085 A * 4/1985 Kaye ................................. 356/71  
5,072,120 A   12/1991 Siewick  
(Continued)

FOREIGN PATENT DOCUMENTS

DE   102004055761 A1   5/2006  
EP       1496479 A1   1/2005  
(Continued)

OTHER PUBLICATIONS

Rendle DF et al; "Design Note: An inexpensive device for the examination of light objects using soft X-rays"; Measurement Science and Technology; 10P, Bristol, BG, vol. 1, No. 9, Sep. 1, 1990, pp. 986-988.

*Primary Examiner* — Daniel Wu  
*Assistant Examiner* — Mohamed Barakat  
(74) *Attorney, Agent, or Firm* — Nexus Law Group LLP; Nicholas P. Toth

(57) ABSTRACT

Privacy of information is protected by a method of securing access to information associated with a value item, the method involving comparing a security signature and a stored profile, and permitting access to the information associated with the value item if the security signature matches the stored profile.

An apparatus and method for detecting an item is provided in accordance with other aspects of the invention. The apparatus includes one or more sources operable to produce electromagnetic radiation in a range of wavelengths of the electromagnetic spectrum; and one or more imaging devices, such as cameras, operable to produce images of the item. Different images may be produced for different ranges of wavelengths being produced. A material profile may be made from digital representations of the images for subsequent authentication of the item and for detecting changes to the item.

26 Claims, 15 Drawing Sheets

(56) References Cited

U.S. PATENT DOCUMENTS

| | | | |
|---|---|---|---|
| 5,483,363 A * | 1/1996 | Holmes et al. | 359/2 |
| 6,064,747 A * | 5/2000 | Wills et al. | 382/100 |
| 6,446,865 B1 * | 9/2002 | Holt et al. | 235/382 |
| 6,470,093 B2 * | 10/2002 | Liang | 382/135 |
| 6,592,033 B2 * | 7/2003 | Jennings et al. | 235/385 |
| 6,842,172 B2 * | 1/2005 | Kobayashi | 345/419 |
| 6,965,340 B1 * | 11/2005 | Baharav et al. | 342/22 |
| 6,970,236 B1 * | 11/2005 | Markantes et al. | 356/71 |
| 7,387,393 B2 * | 6/2008 | Reich et al. | 359/529 |
| 7,711,180 B2 * | 5/2010 | Ito et al. | 382/154 |
| 2003/0169415 A1 * | 9/2003 | Premjeyanth et al. | 356/71 |
| 2004/0159787 A1 * | 8/2004 | Nakasuji et al. | 250/311 |
| 2005/0232487 A1 * | 10/2005 | Fleisher | 382/181 |
| 2005/0237616 A1 * | 10/2005 | Hillmann et al. | 359/566 |

FOREIGN PATENT DOCUMENTS

| | | |
|---|---|---|
| EP | 1589496 A1 | 10/2005 |
| EP | 1610270 A2 | 12/2005 |
| WO | 03012412 A2 | 2/2003 |
| WO | 2004036508 A2 | 4/2004 |
| WO | 2006021083 | 3/2006 |

* cited by examiner

APPARATUS AND METHOD FOR SECURE DETECTION OF AN ITEM AND A METHOD OF SECURING ACCESS TO INFORMATION ASSOCIATED WITH THE ITEM

FIELD OF THE INVENTION

This invention relates to the authentication of documents or other items and the protection of information and privacy and, in particular, relates to an apparatus and method for secure detection of an item and a method of securing access to information associated with the item.

DESCRIPTION OF RELATED ART

The protection of information and privacy is of paramount importance in the use of a document, such as a machine readable passport or smart card, having attached to it an electronic processor and an electronic storage medium that is capable of storing data representing information associated with the document.

Access to the data stored in the electronic storage medium of the document may be restricted by including on the surface of the document a bar code optically readable by a machine that detects the dimensions of individual bars in the bar code. The detected dimensions are used to generate a code that provides access to the stored data. However, the use of a bar code is insecure because the code can be generated by optically reading a mere photocopy of the document, thereby providing access to the stored data without optically reading the document itself.

Data encryption techniques may be used to prevent unauthorized access to secure data. However, such encryption techniques cannot fully protect the encrypted data in circumstances where access to a decryption key for decrypting the encrypted data is not adequately secured.

Thus, there is a need in the art for an improved method of securing access to information associated with a document or other item of value, including information represented by encrypted or unencrypted data stored in an electronic storage medium.

An apparatus including photodiode sensors and a method of verifying the authenticity of a value item which involves producing a response from the photodiode sensors is described in the international publication No. WO 2006/021083 published on 2 Mar. 2006, naming TALWERDI et al. as applicant, and entitled APPARATUS AND METHOD FOR SECURE IDENTIFICATION OF SECURITY FEATURES IN VALUE ITEMS, which is incorporated herein by reference for all purposes.

Markings which are visible to the naked eye have been applied to the outer surface of a document or other item in an attempt to permit the item to be uniquely identified and authenticated by visual inspection of the item itself or visual inspection of an image of the item. However, any modification, alteration or other change to the item that is not visible to the naked eye cannot be detected.

Thus, there is a need in the art for an improved apparatus and method for imaging a document or other item for identification of the item and detection of changes in the item so as to authenticate the item.

SUMMARY

The shortcomings described above can be addressed by providing a method of securing access to information associated with a value item, the method involving comparing a security signature and a stored profile, and permitting access to the information associated with the value item if the security signature matches the stored profile.

In accordance with another aspect of the invention, there is provided an apparatus for detecting an item, the apparatus including: a source operable to produce electromagnetic radiation in a range of wavelengths of the electromagnetic spectrum; and an imaging device operable to produce an image of the item. The apparatus may be operable to produce a digital representation of the image. The imaging device may be operable to produce a digital representation of the image. The apparatus may include a plurality of sources, including a plurality of sets of one or more sources. The apparatus may include a controller operable to control the imaging device and the source, sources and/or sets of sources such that the image is produced when the source(s) are producing electromagnetic radiation.

The apparatus may include a processor operable to produce a material profile from the digital representation. The apparatus may include a memory for storing the digital representation. The memory may be operable to store the material profile. The apparatus may be operable to transmit the digital representation. The apparatus may be operable to transmit the material profile.

The source(s) may be operable to produce electromagnetic radiation in a plurality of ranges of wavelengths of the electromagnetic spectrum, including overlapping wavelength ranges. The controller may be operable to control the source(s) so as to produce electromagnetic radiation in a selected wavelength range, including sequentially producing electromagnetic radiation in a plurality of selected wavelength ranges. Each source may be operable to produce electromagnetic radiation in multiple, including discontinuous, sub-ranges of wavelengths within a range of wavelengths. The controller may be operable to control the imaging device and the source(s) such that a plurality of images are sequentially produced, each of the plurality of images being produced when the source(s) are producing electromagnetic radiation in a corresponding wavelength range.

The imaging device may be a camera. The camera may be operable to produce photographic images. The camera may be a digital camera. The camera may be operable to produce digital representations of photographic images. The camera may be a two-dimensional camera. The camera may be a three-dimensional camera for producing three-dimensional images. The camera may be a thermal imaging camera. The imaging device may include one or more filters for filtering input to the camera. The camera may include one or more filters for filtering input to the camera. The apparatus may include a plurality of imaging devices.

The apparatus may include a housing dimensioned to receive the item. The housing may include a bottom wall, a top wall, and one or more side walls extending between the bottom wall and the top wall. The housing may include a support plate for supporting the item. The support plate may be attached to the top wall. The support plate may form an integral part of the top wall. The top wall may be the support plate. The support plate may be transparent. The support plate may be made of a material selected from the group consisting of: glass, plastic, clear plastic and plexiglass. The one or more side walls may be one or more inner side walls. The housing may include one or more outer side walls. The source(s) may be supported by the side walls, including supporting the source(s) to direct electromagnetic radiation toward the top wall. The source(s) may be oriented to direct electromagnetic radiation toward the support plate. The bottom wall may be an inner bottom wall. The housing may include an outer bottom wall. The imaging device may project through the bottom wall. The bottom wall may be operable to support the imaging device. The imaging device may be attached to the bottom wall and directed toward the top wall. The imaging device may be oriented to produce an image of the item when the item is being supported by the support plate. The imaging device may be attached to the housing on the same or opposite side of the support plate as the source(s). The support plate may attached to the housing intermediate between the bottom and top walls.

In accordance with another aspect of the invention, there is provided a method of detecting an item, the method involving: producing electromagnetic radiation in a range of wavelengths of the electromagnetic spectrum by a source; and producing an image of the item. Producing an image of the item may involve producing an image of the item when the item is being exposed to electromagnetic radiation produced by the source. The method may further involve producing a digital representation of the image. The method may further involve producing a material profile from the digital representation. The method may further involve storing the digital representation in a memory of the apparatus. The method may further involve storing the material profile in a memory of the apparatus. The method may further involve transmitting the digital representation. The method may further involve transmitting the material profile. The method may include retrieving the material profile or image and comparing it to a stored profile to determine the validity of a value item. A virtual security feature may be added to an image to create an independent means of verifying the validity of the value item during the retrieval and comparison of the new image and stored image process.

Producing electromagnetic radiation in a range of wavelengths of the electromagnetic spectrum may involve producing electromagnetic radiation in a selected wavelength range. Producing electromagnetic radiation in a range of wavelengths of the electromagnetic spectrum may involve sequentially producing electromagnetic radiation in a plurality of selected wavelength ranges. Producing an image of the item may involve sequentially producing a plurality of images of the item, each image being produced when electromagnetic radiation is being produced in a corresponding wavelength range.

Producing a material profile from the digital representation may involve digital processing of digital representations of images. The digital processing may include any, none or all of: digital compression; normalization; signal processing; filtering; encrypting; concatenation; combining a plurality of digital representations; correction; reduction; and truncation.

The digital processing may involve processing pixel image data. Processing pixel image data may involve processing numerical values representing image pixels of an image. The digital processing may involve selecting one or more images having been captured by the camera; selecting a pixel location of the selected images; producing a pixel data set associated with the selected pixel location from the pixel image data associated with the pixels of the selected images corresponding to the selected pixel location; determining whether all the desired pixel locations have been processed; selecting a new pixel location; and producing the material profile from the produced pixel data sets. Producing the material profile from the produced pixel data sets may involve combining pixel data from the pixel data sets.

Further features of the present invention will be understood in view of the detailed description of embodiments of the invention and the accompanying drawings

DRAWINGS

In drawings which illustrate embodiments of the invention,
FIG. 1 is a perspective view of a scanner in accordance with a first embodiment of the invention;

DETAILED DESCRIPTION OF EMBODIMENTS OF THE INVENTION

A method of securing access to information associated with a value item is provided. The method involves comparing a security signature and a stored profile, and permitting access to the information associated with the value item if the security signature matches the stored profile.

Referring to FIGS. 1 to 11, the value item 100 may be a government-issued or other official document such as a passport, visa, driver's license card or identification card; a financial document such as a check, credit card, debit card, stock certificate, money order or bank note; or any other item of value such as a painting or its associated certificate or other documentation. The value item 100 may be a machine readable passport, an e-passport or other machine readable travel document. The value item 100 may be in compliance with an industry standard such as a standard of the International Civil Aviation Organization (ICAO) or a standard of the International Organization for Standardization (ISO).

The information associated with the value item 100 may include information identifying an individual such as a digital representation of a hand-written signature, information identifying a position, role or title, of an individual, information identifying an organization, a value estimation, time or date information, an address or other information identifying a geographical location, and information identifying a value item type. The information associated with the value item 100 may be updated from time to time, provided access to the associated information is permitted.

Figure 1:
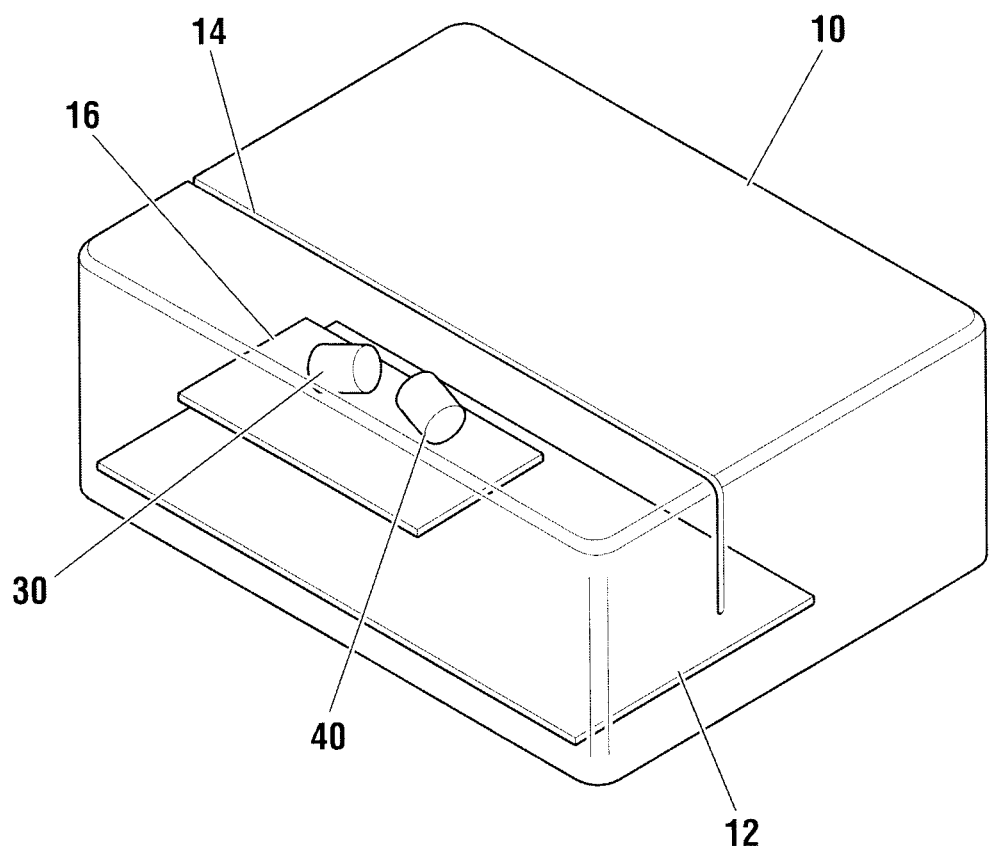

FIG. 1 is a perspective view of a terminal unit or scanner 10 in accordance with the first embodiment of the invention. The scanner 10 is an electronic device incorporating a radiating stimulus or source 30 and a sensor 40. The scanner 10 includes a main circuit board 12 housing a main circuit for controlling activities of the scanner 10, a track 14 to align and hold a value item 100, which may be a document, in position to pass in front of the source 30 and the sensor 40, and a sensor circuit board 16 to which the sensor 40 is electrically connected. The scanner 10 may be operable to scan one or more value items 100 simultaneously.

Figure 2:
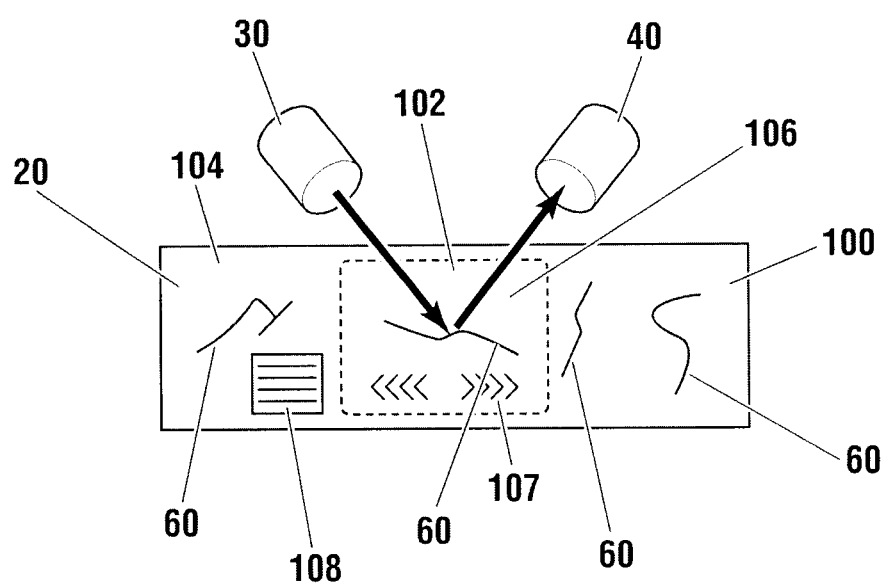
FIG. 2 is a perspective view of a source and a sensor of the scanner shown in FIG. 1, shown on the same side of a substrate according to the invention.

Referring to FIGS. 1 and 2, the scanner 10 may be operable to detect one or more boundaries of the value item 100, including detecting one or more boundaries of an outer surface area of the value item 100, and may be operable to scan areas defined by such one or more boundaries. Multiple portions of the value item 100 may be scanned sequentially or simultaneously, and the protection of information and privacy is typically enhanced by increasing the size of the portion or portions of the value item 100 being scanned. In an embodiment of the invention, the scanner 10 is operable to scan within one or more portions of the substrate 20, including possibly within a first portion 102, within a second portion 104, or within both the first and second portions 102 and 104. In the exemplary embodiment shown in FIG. 2, the first portion 102 is a machine readable zone 106 for displaying information readable by a machine, including being readable by a machine employing optical character recognition techniques, and the second portion 104 consists of the remainder of the side of the value item 100 shown in FIG. 2. The information displayed in the machine readable zone 106 may be alphanumeric characters, geometric shapes, symbols, including graphical symbols, or other markings such as the markings 107 shown in FIG. 2. The markings 107 preferably conform to an industry standard, but need not.

The value item 100 may have an electronic storage medium 108 associated with it for storing the associated information. The electronic storage medium 108 is preferably attached to the value item 100, and may be embedded within the value item 100, surface mounted to the outer surface of the value item 100, or partially embedded within the value item 100 near its outer surface. The electronic storage medium 108 may include a magnetic stripe, an integrated circuit with contacts, a contactless integrated circuit, an optical memory unit, a bar code, and any combination thereof. The electronic storage medium 108 may include a microprocessor, microcontroller, a read-only memory, programmable read-only memory, erasable programmable read-only memory, electrically erasable programmable read-only memory, flash type memory, or any combination thereof, for example. The electronic storage medium 108 may be operable to store data in accordance with industry standards such as the Logical Data Structure (LDS) standard.

The source 30 produces a stimulus which may be electromagnetic radiation in a range of wavelengths of the electromagnetic spectrum, including ultraviolet radiation, visible light radiation, infrared radiation, and any combination thereof. The source 30 preferably produces electromagnetic radiation having a wavelength within the range of 200 nm to 1100 nm, and may include a light-emitting diode, which may be of an energizing type. In some embodiments of the invention, the source 30 produces heat energy, laser or cold laser beams, radio waves, or any other suitable stimulus, including magnetic field stimuli for detection by any one or more of magnetic ink readers, magnetic credit card readers, or magnetic strip readers.

The sensor 40 is preferably capable of sensing the stimulus produced by the source 30, including electromagnetic radiation having a wavelength in the range of 200 um to 1100 um or any sub-range thereof. The sensor 40 may include a photodiode, and may additionally include a filter for limiting the range of wavelengths sensed by the photodiode. In some embodiments of the present invention, the sensor 40 may form part of any one or more of a magnetic ink reader, magnetic credit card reader or magnetic strip reader, for example.

FIG. 2 shows electromagnetic radiation being emitted from the source 30 toward a value item 100, reflecting off the surface of the value item 100, which may be at, near or distal from a security feature 60, and being sensed by the sensor 40 to produce a sensor 40 output.

Referring to FIGS. 1 and 2, the scanner 10 functions for a range of substrates 20 materials including paper, wood, metal, cloth, glass, fiberglass, plastic or any solid material that can be painted, printed, documented, or blended with one or more security features 60 during or after manufacturing of the substrate 20. The substrate 20 may be transparent, translucent, or opaque, and may carry a protective shield. The substrate 20 may be made of a material having naturally occurring and randomly distributed machine readable features. The present invention is not limited to value items 100, machine readable zones 106 or substrates 20 of any particular size.

Figure 3:
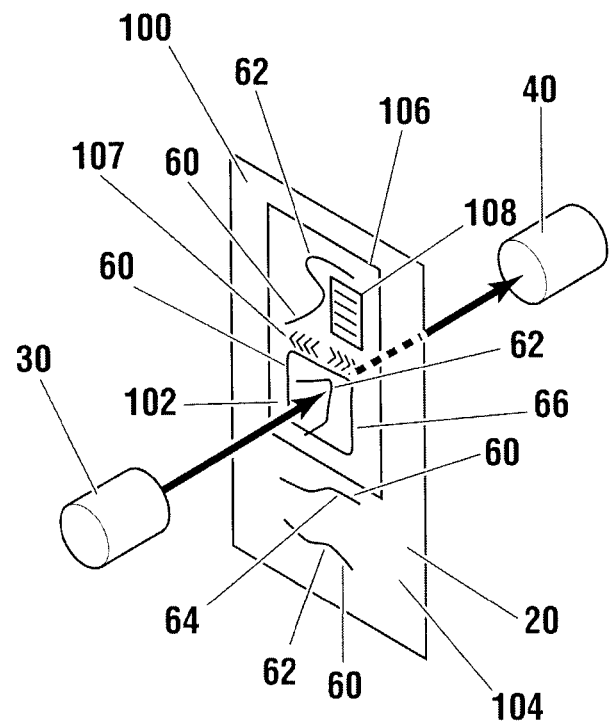
FIG. 3 is a perspective view of a source and a sensor of a modified version of the scanner shown in FIG. 1, showing the source and the sensor on opposite sides of the substrate shown in FIG. 2.

FIG. 3 shows one embodiment of the invention that is a modified version of the embodiment shown in FIG. 2. In FIG. 3, the source 30 produces a stimulus that is directed toward the value item 100 and strikes the surface of the substrate 20, passes through the substrate 20, and is sensed by the sensor 40 located on the side of the value item 100 opposite the source 30.

Examples of security features 60 include security fibers 62 having a single color or multiple colors, security fibers 62 having a single or multiple fluorescent colors, security fibers 62 having a non-fluorescent color, and any combination thereof. The security feature 60 may be a security ink 64 having a single color or multiple colors, a security ink 64 having a single or multiple fluorescent colors, a security ink 64 having a non-fluorescent color, and any combination thereof, for example. As a further example, the security feature 60 may be a planchette 66. A metal or heat sensitive security fiber 62 may produce a response detectable by the sensor 40 in response to a heat stimulus from the source 30. A fluorescing security feature 60 may produce visible light in response to ultraviolet radiation emitted from the source 30. In some embodiments of the invention, the sensor 40 may be operable to sense a security feature 60 under ambient lighting conditions, and some security features 60 need not be illuminated by any source 30 in order to be sensed by the sensor 40. Some security features 60 are visible to the human eye in ambient light conditions or under illumination from the source 30. A security fiber 62 may fluoresce with a specific color, including fluorescing with a color in the visible light range selected to identify a particular individual, organization, or type of value item 100.

By way of further examples, the security feature 60 may be inherent to the substrate 20, such as in the case of natural imperfections occurring incidentally as a result of manufacturing the substrate 20, or be deliberately introduced to the substrate 20. The security feature 60 may be applied to the substrate 20 before, during or after the manufacturing of the substrate 20. A security feature 60 may be applied before manufacturing the substrate 20 by blending the security feature 60 into a raw material from which the substrate 20 is then manufactured. The security feature 60 may be added to the outer surface, or a portion thereof, of the substrate 20 or, additionally or alternatively, be embedded at a depth within the substrate 20. The security feature 60 may be distributed randomly on or within the substrate 20, whether inherently resulting from the manufacturing of the substrate 20 or deliberately arranged in a random distribution.

Figure 4:
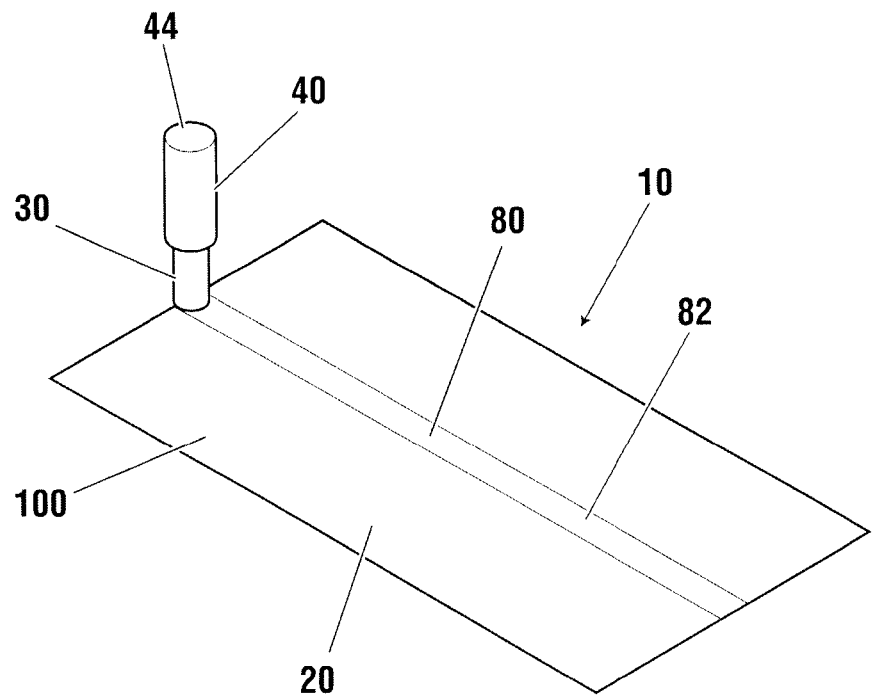
FIG. 4 is a perspective view of the substrate shown in FIG. 2, showing a narrow scanning path.

FIG. 4 shows the scanner 10 in accordance with one embodiment of the invention, in which the source 30 is a narrow beam single source 30 which produces stimuli along a scanning path 80 of the substrate 20 of the value item 100. In the embodiment of FIG. 4, the scanning path 80 is a narrow scanning path 82 and the sensor 40 is an infrared sensor 44. The scanner 10 may traverse the narrow scanning path 82 by causing the source 30 to move, including possibly tilt, with respect to the substrate 20, causing the sensor 40 to move, including possibly tilt, with respect to the substrate 20, causing both the source 30 and the sensor 40 to move, including possibly tilt, with respect to the substrate 20, causing the substrate 20 to move, including possibly slide, with respect to the source 30, the sensor 40 or both the source 30 and the sensor 40, or by any combination thereof.

Figure 5:
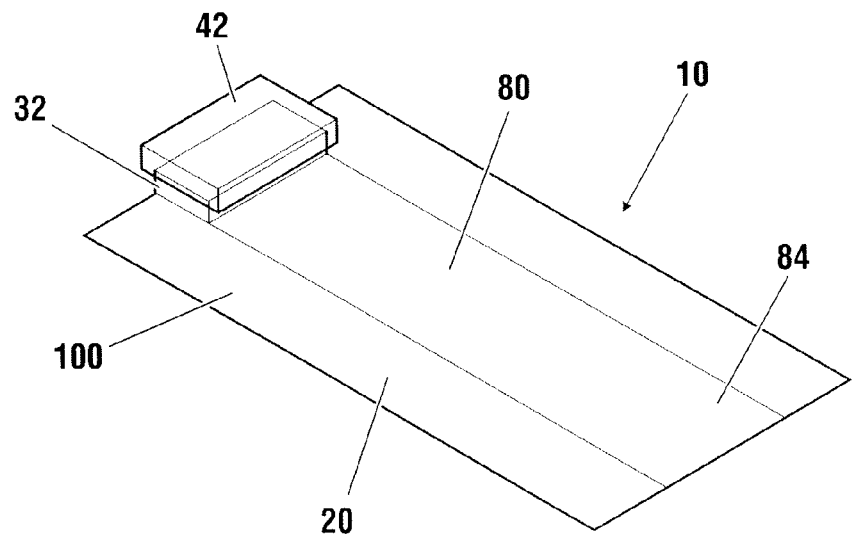
FIG. 5 is a perspective view of the substrate shown in FIG. 2, showing a source array and a sensor array in accordance with one embodiment of the invention.

FIG. 5 shows the scanner 10 in accordance with one embodiment of the invention having features which may be combined with or implemented as an alternative to the embodiment shown in FIG. 4. As shown in FIG. 5, a source matrix 32 of the sources 30 produces stimuli along the scanning path 80, which is a wide scanning path 84, of the substrate 20 of the value item 100, and a sensor matrix 42 of the sensors 40 senses stimuli along the wide scanning path 84. The scanner 10 may traverse the wide scanning path 84 in a manner similar to that described above in regard to the narrow scanning path 82. The sources 30 of the source matrix 32 may all produce the same stimuli or produce different stimuli. For example, some sources 30 of the source matrix 32 may produce ultraviolet radiation and other sources 30 may produce infrared radiation. The sensors 40 of the sensor matrix 42 may be of similar or different types, and each type of sensor 40 is typically in accordance with a corresponding type of source 30. The types of sources 30 and types of sensors 40 are selected to be suitable for the type or types of security features 60 employed.

The sources 30 of the source matrix 32 and the sensors 40 of the sensor matrix 42 may be arranged generally in a plurality of rows forming columns of sources 30 and sensors 40, respectively. The source matrix 32 may in some embodiments include only one row of sources 30, thereby forming an array of sources 30. Similarly, the sensor matrix 42 may in some embodiments include only one row of sensors 40, thereby forming an array of sensors 40. The arrays of sources 30 and sensors 40 may respectively be aligned longitudinally, transversely or angularly, including diagonally, to the longitudinal axis of the wide scanning path 84. Other non-rectangular arrangements of the sources 30 and the sensors 40 in the source matrix 32 and the sensor matrix 42, respectively, are within the scope of the present invention.

The scanning path 80 may be oriented with respect to a longitudinal axis of the substrate 20, as shown in FIGS. 4 and 5. Alternatively, the scanning path 80 may be oriented transversely or angularly, including diagonally, with respect to the longitudinal axis of the substrate 20. In some embodiments, the scanner 10 is operable to scan diagonally with respect to a longitudinal axis of the machine readable zone 106 (FIGS. 1 and 2).

Figure 6:
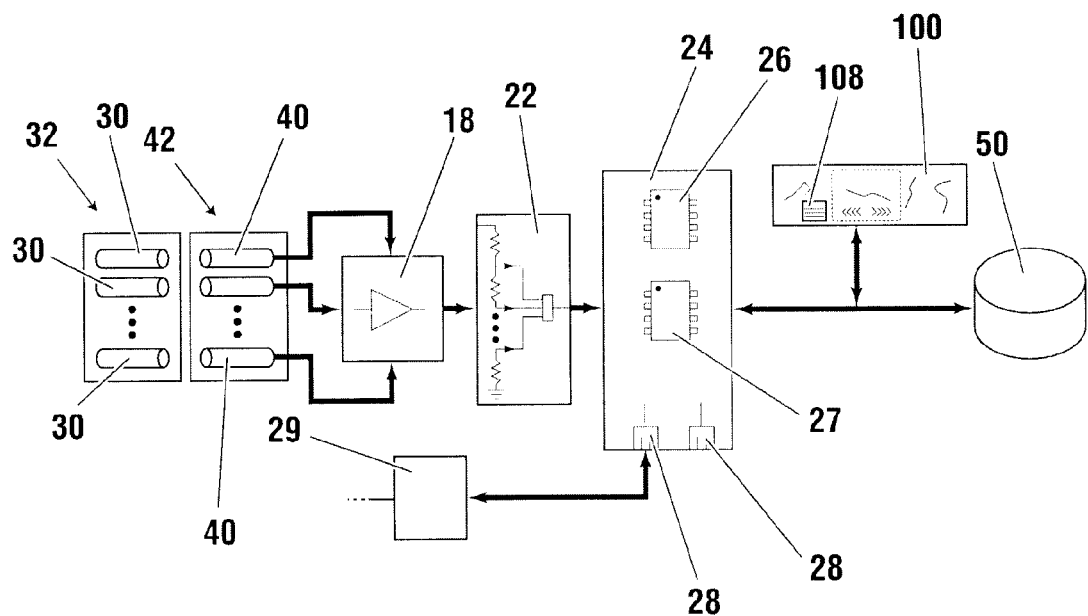
FIG. 6 is a diagram of electronic components of the scanner shown in FIG. 1.

FIG. 6 shows a schematic diagram of electronic components of the scanner 10 in accordance with one embodiment of the invention. Referring to FIG. 6, each sensor 40 output is preferably an analog electrical signal having properties which are analogous to the sensed stimulus. Each sensor 40 output is conditioned by a conditioning electronic circuit 18, which may include an amplifier such as a low-noise amplifier and/or an automatic gain control amplifier and which may further include analog filtering, in order to produce a conditioned output. Preferably, the conditioning circuit 18 improves the signal-to-noise ratio of the analog signal. The conditioned output is digitized by an analog-to-digital converter 22 to produce a digital representation of the sensed stimulus. The digital representation is digitally processed by a processor 24.

As shown in FIG. 6, the processor 24 may include a processing circuit 26, a memory circuit 27 and one or more peripheral interfaces 28. The processing circuit 26 may include a microprocessor or micro-controller for digital processing, for example. The memory circuit 27 may include a read-only memory, programmable read-only memory, erasable programmable read-only memory, electrically erasable programmable read-only memory, flash type memory, or any combination thereof, for example. Preferably, at least one peripheral interface 28 is operable to facilitate signal transmission between the processor 24 and a motion control unit 29, which is operable to cause the traversal of the scanning path 80 (FIGS. 4 and 5). In some embodiments, the motion control unit 29 detects motion of a value item 100, such as in the case of a hand-swiped value item 100. The electronic circuitry shown in FIG. 6 may be implemented to form a single monolithic integrated circuit or a plurality of electronic devices in association with a single circuit board or a plurality of circuit boards, for example.

The scanner 10 is preferably operable to control the timing of the scanning operation of the scanner 10, including controlling the timing of the scanning operation to produce the digital representation of the sensed stimulus such that it has a specified number of data points corresponding to a specified distance along the scanning path 80. The timing of the scanning operation may be controlled in accordance with specifications related to the value item 100. For example, the motion control unit 29 may include a stepper motor whose operation is coordinated with the timing of the digitization process to produce the digital representation such that it has a specific number of data points per centimeter of distance along the scanning path 80. Such specifications may relate to the machine readable zone 106 in compliance with an industry standard. For example, any or all of the size and shape of the value item 100, the size of the machine readable zone 106, the location of the machine readable zone 106 on the value item 100, the font size and font type of alphanumeric characters displayed in the machine readable zone 106, and margin sizes related to the machine readable zone 106 may be specified by an industry standard. The timing of the scanning operation, including the timing of the sensing operation of the sensor 40, the timing of the digitization process of the analog-to-digital converter 22, the timing of the operation of the motion control unit 29, or any combination thereof, may be controlled in accordance with specifications of a standard. For example, in an embodiment in which the scanner 10 is operable to scan a hand-swiped value item 100, the timing of the scanning operation may be controlled by using the sensor 30 to sense the presence of a plurality of markings 107 having a specified distance therebetween and to adjust the timing of the digitization process to achieve a desired number of data points of the digital representation.

In the first embodiment, digital processing of the processor 24 produces a security signature that uniquely identifies the particular value item 100 being scanned by the scanner 10. Such digital processing may include normalization, signal processing to improve a signal-to-noise ratio, concatenation, data reduction, data compression, correction processing such as age, use or other correction processing, data truncation, data encryption, and any combination thereof.

The security signature is typically implemented as a sequence of numerical values representing of one or more characteristics of one or more security features 60, or one or more portions thereof. Such characteristics may include the position or distance of the security feature 60 along the scanning path 80 (FIGS. 4 and 5); a position of the security feature 60 on the surface, or portion thereof, of the substrate 20, which may be specified by X and Y coordinates; the embedded depth in the manufactured material or substrate 20 of the security feature 60, which may be specified by a Z coordinate; the length, thickness or other indication of size, of the security feature 60 or portion thereof; the color of the security feature 60; and the shade of the security feature 60, and any combination thereof, for example.

In the first embodiment of the invention, the security signature is reproducibly produced such that scanning a given value item 100 multiple times, including multiple times by different scanners 10 at different locations, produces security signatures that are substantially equivalent to the extent that the value item 100 has not been defaced, adulterated or otherwise modified.

The processor 24 preferably stores the security signature in the electronic storage medium 108 of the value item 100 as a stored profile that uniquely identifies the value item 100. Additionally or alternatively, the security signature associated with a given value item 100 may be stored in an external database 50 external to the given value item 100 as a stored profile uniquely identifying the given value item 100. The external database 50 may be used as a backup or otherwise redundant storage medium for one or more security signatures produced in accordance with the present invention. In the first embodiment, the attachment of the electronic storage medium 108 to the value item 100 permits mobile secure access to the associated information, and permits secure access in circumstances in which storing the security signature in the external database 50 or retrieving the security signature from the external database 50.

Figure 7:
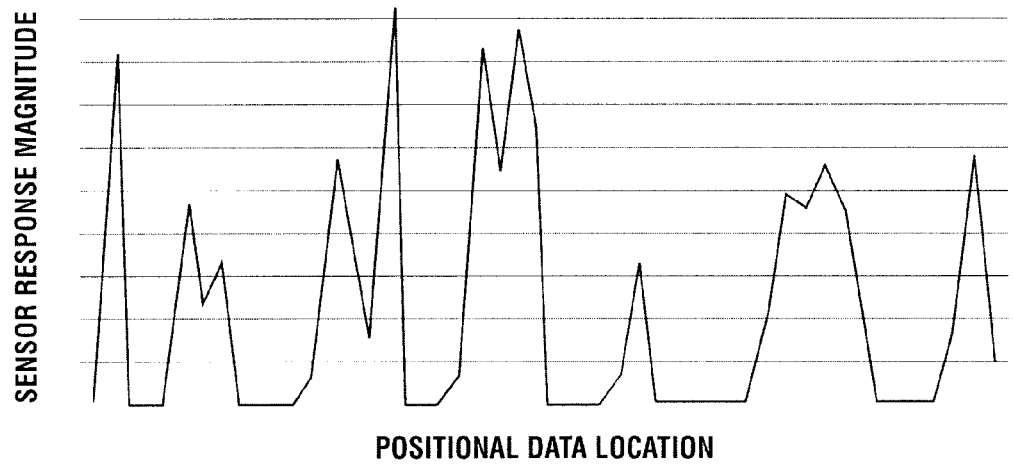
FIG. 7 is a graphical representation of a security signature produced by the scanner shown in FIG. 1.

FIG. 7 shows an exemplary graphical representation of a security signature in which the horizontal axis labeled "positional data location" represents a linear distance along the scanning path 80 (see also FIGS. 4 and 5) and the vertical axis labeled "sensor response magnitude" represents the magnitude of radiation emitted from a substrate 20 having one or more security features 60 applied thereto. As a further example, the vertical axis may represent the optical intensity of visible light emitted by fluorescing fibers 62 (FIG. 3) applied to the substrate 20 along the scanning path 80.

Figure 8:
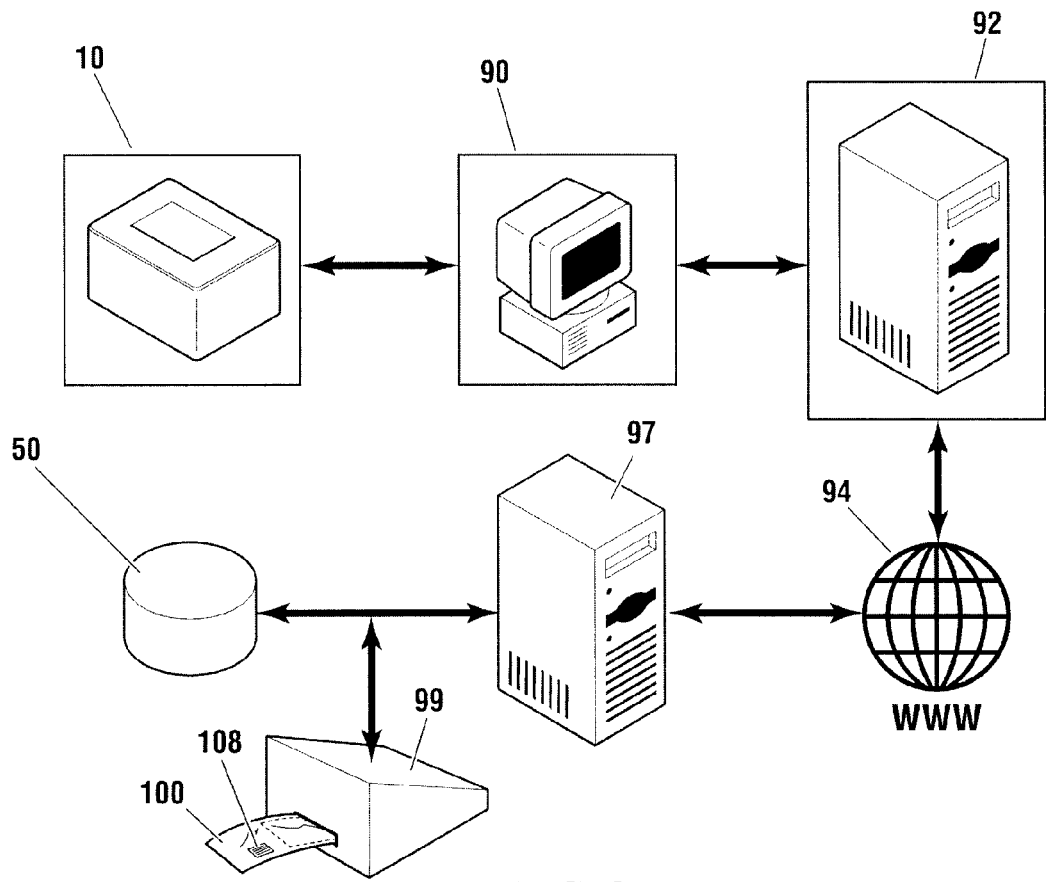
FIG. 8 is a diagram of a system for networked access to associated information in accordance with one embodiment of the invention.

FIG. 8 shows an exemplary system for networked access to the associated information, in accordance with one embodiment of the invention. In the system of FIG. 8, the scanner 10 is operable to scan a given value item 100, produce therefrom a security signature, and transmit the security signature to a personal computer 90 connected to the scanner 10. The personal computer 90 is operable to receive the security signature and transmit the received security signature to a branch local area network server 92, which is operable to receive the security signature and transmit the received security signature via a direct or network link, such as the internet link 94 shown in FIG. 8, to a processing centre 97. The processing centre 97 is operable to receive the security signature and cause a data writer 99 to store the received security signature as a stored profile in the electronic storage medium 108 of the given value item 100. Additionally or alternatively, the security signature may be stored as a stored profile in the external database 50.

Not all of the system components shown in FIG. 8 are necessary for the system of FIG. 8 to be operable. For example, the scanner 10 may have incorporated therein the data writer 99, the external database 50, or both the data writer 99 and the external database 50 such that the scanner 10 itself is operable to store the security signature as a stored profile. By way of further example, the scanner 10 may be connected, directly or via one or more of the communication components of the system of FIG. 8, to the data writer 99, the external database 50, or both the data writer 99 and the external database 50.

Method of Operation

Figure 9:
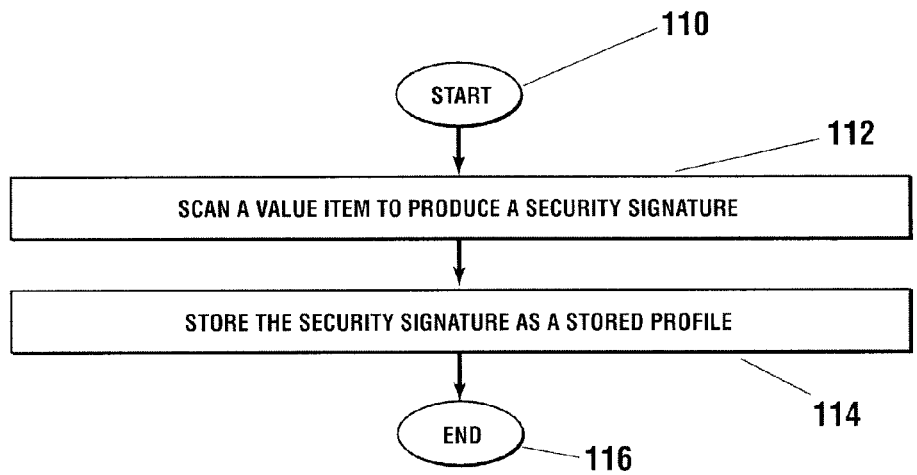
FIG. 9 is a flow diagram of a process of creating a stored profile in accordance with the first embodiment of the invention.

In the first embodiment and as shown in FIG. 9, the memory circuit 27 (FIG. 6) contains blocks of code for directing the processing circuit 26 (FIG. 6) to perform a process, shown generally at 110, of creating a stored profile. The process of FIG. 9 is typically performed on a given value item 100 before the given value item 100 is issued for general use.

When a given value item 100 is presented at the scanner 10, block 112 directs the processing circuit 26 to cause the scanner 10 to scan the given value item 100, including possibly scanning multiple portions of the substrate 20 multiple times, and to produce a security signature that uniquely identifies the given value item 100.

Block 114 then directs the processing circuit 26 to store the security signature as a stored profile. The processing circuit 26 preferably stores the stored profile in the electronic storage medium 108 of the value item 100. Additionally or alternatively, the processing circuit 26 stores the stored profile in a storage medium external to the value item 100, such as the external database 50 (FIGS. 6 and 8).

Prior to, simultaneous with, or subsequent to executing block 112, the associated information may be stored in the electronic storage medium 108, the external database 50, or both the electronic storage medium 108 and the external database 50. In the first embodiment, the associated information is stored in a manner such that access to the associated information is denied without proper use of an access code unique to the associated information and to the given value item 100.

Block 116 directs the processing circuit 26 to end the process 110.

Figure 10:
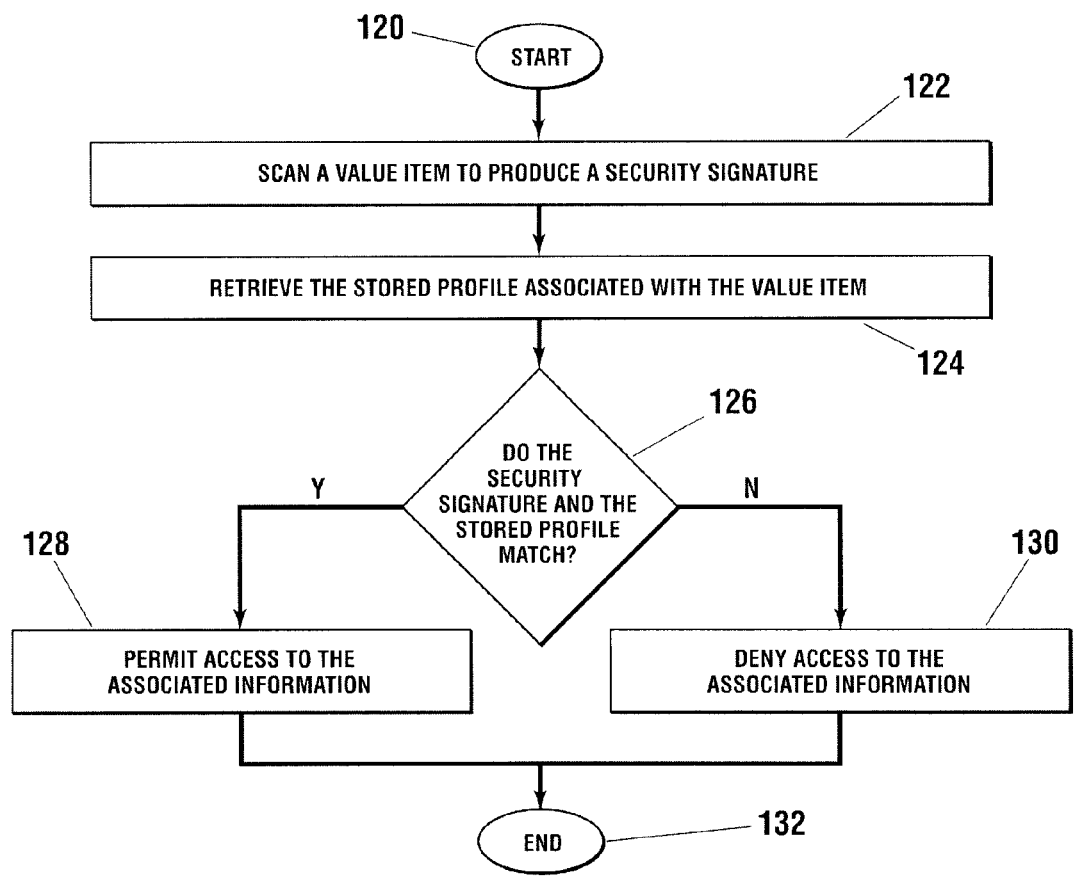
FIG. 10 is a flow diagram of a process of determining whether to permit access to the associated information in accordance with the first embodiment of the invention.

In the first embodiment and as shown in FIG. 10, the memory circuit 27 (FIG. 6) contains blocks of code for directing the processing circuit 26 (FIG. 6) to perform a process, shown generally at 120, of determining whether to permit access to the associated information. The process of FIG. 10 is illustrative of circumstances in which a given value item 100 has associated with it a stored profile and associated information, and has been issued for general use. The stored profile and the associated information are preferably stored within the electronic storage medium 108, but may alternatively be stored in the external database 50, or in both the electronic storage medium 108 and the external database 50.

When a given value item 100 is presented at the scanner 10, block 122 directs the processing circuit 26 to cause the scanner 10 to scan the given value item 100 and produce a security signature that uniquely identifies the given value item 100.

Block 124, which may be executed before, after or simultaneously with the execution of block 122, directs the processing circuit 26 to retrieve the stored profile associated with the given value item 100, preferably from the electronic storage medium 108 of the given value item 100 or, alternatively, from the external database 50.

After blocks 122 and 124 have been executed, block 126 directs the processing circuit 26 to compare the security signature produced by block 122 and the stored profile retrieved by block 124. The result of such comparison is used by block 126 to determine whether the security signature and the stored profile match each other. In the first embodiment, block 126 directs the processing circuit 26 to determine whether the security signature and the stored profile match by determining whether the security signature and the stored profile differ by an extent less than a comparison threshold. The comparison threshold may take into account the possibility of measurement error or other tolerance factors. If the security signature and the stored profile differ by less than the comparison threshold, then block 126 determines that the security signature and the stored profile match. If a match is determined, the process proceeds to block 128. If a match is not determined, the process proceeds to block 130.

Block 128 directs the processing circuit 26 to permit access to the associated information, after which the process proceeds to block 132. Block 128 may direct the processing circuit 26 to permit access to the associated information by generating an access code for accessing the associated information, and making the access code available for use. Preferably, the access code is unique to the associated information and to the given value item 100. Accessing the associated information may include using the access code as a decryption key for decrypting data stored in the electronic storage medium 108, the external database 50 or both the electronic storage medium 108 and the external database 50. Block 128 may also direct the processing circuit 26 to generate one or more output messages confirming the match and/or permission to access the associated information, which may include displaying a user message on a computer terminal (not shown) and generating a report for tracking, logging or other purposes.

Block 130 directs the processing circuit 26 to deny access to the associated information, after which the process proceeds to block 132. Block 130 may direct the processing circuit 26 to deny access to the associated information by not generating a useable access code, or by not generating any access code at all. Block 130 may also direct the processing circuit 26 to generate one or more output messages confirming the lack of a match and/or the denial of permission to access the associated information, which may include displaying a user message on a computer terminal (not shown) and generating a report for tracking, logging or other purposes. Such other purposes may include checking for potential fraudulent use of the given value item 100.

Block 132 directs the processing circuit 26 to end the process 120.

Figure 11:
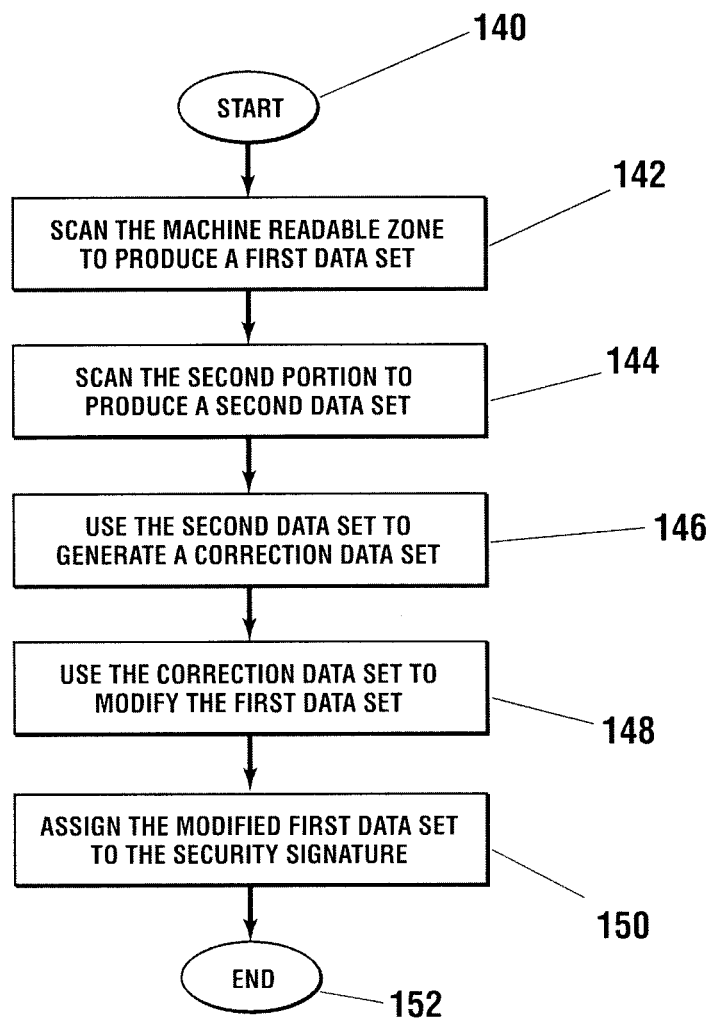
FIG. 11 is a flow diagram of a process of applying correction techniques to the security signature produced by the scanner shown in FIG. 1.

Referring to FIG. 11, in an embodiment of the invention, executing block 122 (shown in FIG. 10) may include applying correction techniques to the security signature in accordance with a process shown generally at 140.

When a given value item 100 is presented at the scanner 10, block 142 directs the processing circuit 26 to cause the scanner 10 to scan the machine readable zone 106 (FIG. 1) of the given value item 100 to produce a first data set. The first data set may represent one or more characteristics of one or more security features 60 located within the machine readable zone 106. The process then proceeds to block 144.

Block 144 directs the processing circuit 26 to cause the scanner 10 to scan the second portion 104 (FIG. 1) of the given value item 100 to produce a second data set. The second data set may represent age-related features of the value item 100 such as color or shading, use-related features of the value item 100 such as the presence of dirt or grease marks, and/or other features of the value item 100. The process then proceeds to block 146.

Block 146 directs the processing circuit 26 to use the second data set to generate a correction data set. The correction data set may include age correction data, use correction data and/or other correction data for the given value item 100 at the particular time of scanning. Generating the correction data set may include comparing the second data set to a pre-determined data set established on the basis of average or typical physical characteristics of a plurality of value items 100 of a type that is similar to the type of the given value item 100. The process then proceeds to block 148.

Block 148 directs the processing circuit 26 to use the correction data set to modify the first data set, thereby producing a modified first data set. Modifying the first data set may include correcting, adapting or otherwise modifying the first data set to take into account aging, use or other factors of the value item 100 determined by block 146. The process then proceeds to block 150.

Block 150 directs the processing circuit 26 to assign the modified first data set to the security signature, which may be considered a corrected security signature.

Block 152 then directs the processing circuit 26 to end the process 140.

Second Embodiment

An apparatus for detecting an item includes: source means for producing electromagnetic radiation in a range of wavelengths of the electromagnetic spectrum; and imaging means for producing an image of the item. The apparatus may include digitizing means for producing a digital representation of the image. The apparatus may include control means for controlling the source means and the imaging means such that the image is produced when the source is producing electromagnetic radiation. The apparatus may include processing means for producing a material profile from the digital representation. The apparatus may include memory storage means for storing the digital representation and the material profile.

Figure 12:
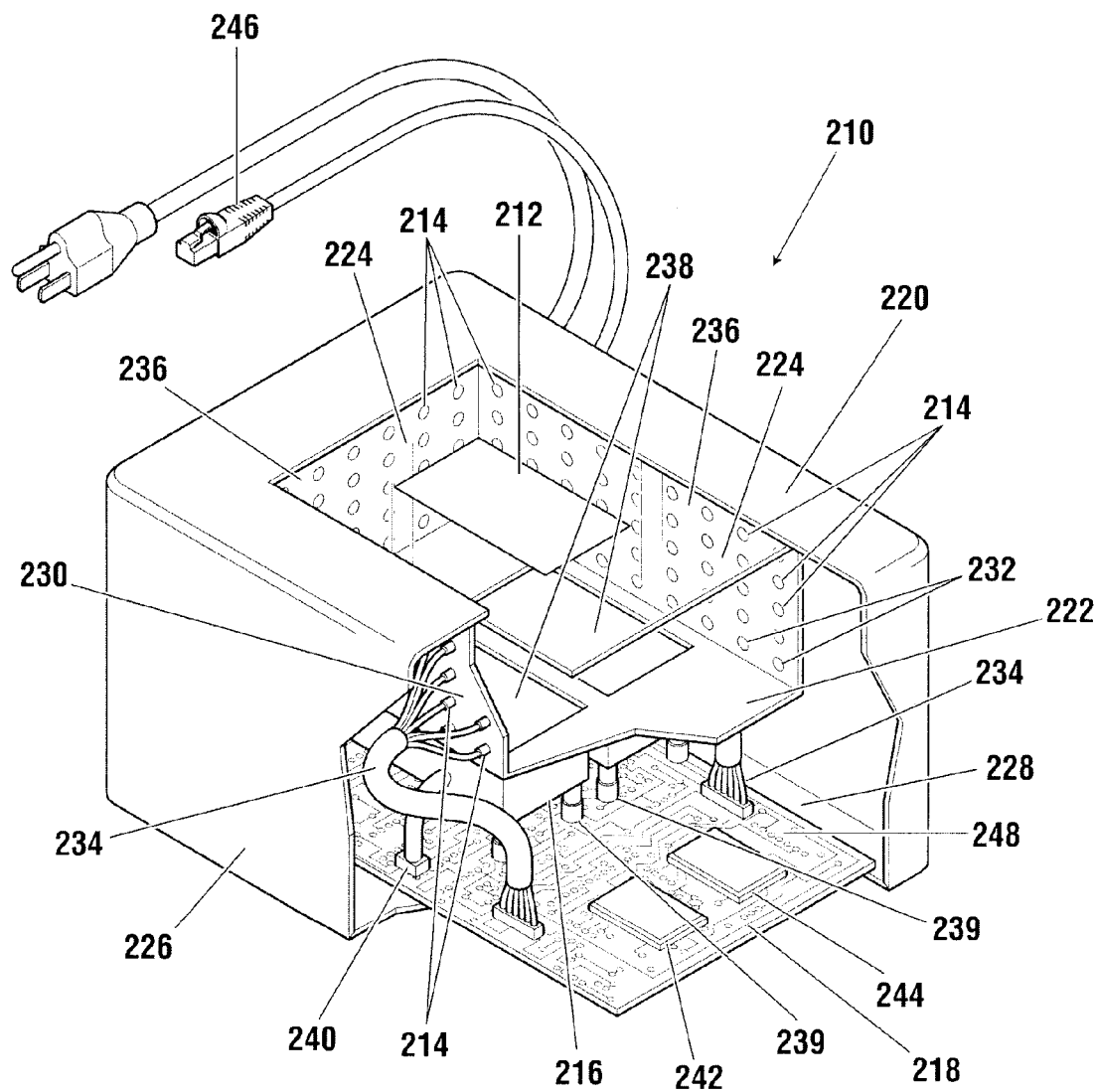
FIG. 12 is a perspective sectional view of an apparatus in accordance with a second embodiment of the invention, showing part of an item being received by the apparatus.

Referring to FIG. 12, a perspective view of a section of the apparatus according to a second embodiment of the invention is shown generally at 210. The apparatus 210 is operable to detect an item such as the item 212, a section of which is shown in FIG. 12. The item 212 may include an identification card, passport, machine readable passport, e-passport, visa, driver's license, birth certificate, other official or government issued document, credit card, debit card, smart card, an item having attached to it an electronic processor and an electronic storage medium that is capable of storing data representing information, memory card, stock certificate, check, currency note, bank note, other financial document, painting, artifact or any other item that is of sufficient value that it might be desirable to securely identify the item, permit or deny use of the item, permit or deny access to information associated with the item, or be able to detect an alteration, modification or other change in or to the item.

The item 212 may be made of paper, wood, metal, cloth, glass, fiberglass, plastic, synthetic resin such as polycarbonate or any solid material, for example. The item 212 may transparent, translucent, or opaque, and may include a protective shield. The item 212 may be made of a material having naturally occurring and randomly distributed machine readable features. The present invention is not limited to items 212 of any particular size.

The item 212 may be identical to or different from the item 100 (FIGS. 2 to 6 and 8) and may include features analogous to corresponding features of the item 100, for example.

FIG. 12 shows the apparatus 210 and the item 212 sectioned vertically to reveal internal components of the apparatus 210, and shows the item 212 section placed on top of the apparatus 210 so as to be received by the apparatus 210. The apparatus 210 preferably includes a plurality of sources 214 of electromagnetic radiation operable to direct electromagnetic radiation toward the item 212 when the item 212 is being received by the apparatus 210, one or more cameras 216 for capturing images of the item 212 being received by the apparatus 210, and electronic circuitry 218 for processing digital representations of the images captured by the cameras 216. Digital representations of images of a given item 212 captured by the cameras 216 may be processed by the electronic circuitry 218 to produce a material profile associated with the given item 212. The material profile may be identical to or different from the security signature which can be produced by the scanner 10 of the first embodiment (FIG. 1), and may have features analogous to corresponding features of the security signature. The material profile may be stored and compared to a subsequent material profile obtained by imaging a subsequently presented item 212 to determine whether the subsequently presented item 212 is substantially identical to, similar to or significantly different from the given item 212, for example. The subsequently presented item 212 is authenticated if the material profile and the subsequent material profile match to an acceptable degree typically defined in accordance with a specifiable standard. Where the subsequently presented item 212 and the given item 212 are considered to be the same items 212, any differences between their respective material profiles are indicative of an alteration, modification or other change to the item 212, including possible fraudulent tampering of the item 212. Also, gradual changes over time in the item 212, such as changes caused by aging and use over time, can be detected.

The apparatus 210 preferably includes a top wall 220, a bottom wall 222, and side walls 224 extending between the top wall 220 and the bottom wall 222. FIG. 12 shows a generally rectangular configuration of the apparatus 210 having four side walls 224, three of which are visible in FIG. 12. In some embodiments, the apparatus 210 includes outer side walls 226 respectively parallel and spaced apart from the side walls 224, which then become the inner side walls 224 shown in FIG. 12, and includes an outer bottom wall 228 parallel and spaced apart from the bottom wall 222, which then becomes the inner bottom wall 222 shown in FIG. 12.

Each source 214 produces a stimulus which may be electromagnetic radiation in a range of wavelengths of the electromagnetic spectrum, including ultraviolet radiation, visible light radiation, infrared radiation, and any combination thereof. The range of wavelengths produced by a given source 214 may include multiple, including discontinuous, sub-ranges of wavelengths within the range of wavelengths. Each source 214 preferably produces electromagnetic radiation having a wavelength within a range not requiring special handling or operator training necessary to safeguard against risks to human health, and may produce electromagnetic radiation having a wavelength in the range of 200 nm to 1100 nm, or one or more sub-ranges thereof. Each source 214 may include a light-emitting diode, which may be of an energizing type. Different sources 214 may produce electromagnetic radiation having different wavelengths. The sources 214 may be arranged in rows and columns of sources 214 mounted to the side walls 224, as shown in FIG. 12, in which each row or each column of sources 214 produce electromagnetic radiation in a specified range of wavelengths different from that of the sources 214 of a different row or column of sources 214, for example. Corresponding rows or columns of sources 214 on different side walls 224 may produce electromagnetic radiation in the same range of wavelengths, for example. In some embodiments of the invention, the one or more sources 214 may produce heat energy, laser or cold laser beams, radio waves, or any other suitable stimulus, including a magnetic field stimulus. Additionally or alternatively, the apparatus 210 may include any or all of a heater, a laser, a radio wave generator, and a magnetic field generator.

Each source 214 may be identical to or different from the source 30 (FIGS. 1 to 4 and 6) and the plurality of sources 214 may be identical to or different from the source matrix 32 (FIG. 5). The source or sources 214 may include features analogous to corresponding features of the source 30 or source matrix 32, respectively.

The sources 214 are preferably mounted to a support structure, such as the source support 230 shown in FIG. 12, and projecting through the side walls 224 to associated source lenses 232. The source support 230 may be a printed circuit board having circuit traces between the sources 214 and a connector header, for example. Each source lens 232 may form an integral part of a corresponding source 214, may be external to the source 214, or may not be included in the apparatus 210 at all. In the embodiment shown in FIG. 12, a source connection 234 provides electrical power to the sources 214 from the electronic circuitry 218. Preferably, different sources 214 may be selectively controlled, such as by selectively activating or de-activating the different sources 214, to expose the item 212 to electromagnetic radiation of selectably different wavelengths at selectable times. In some embodiments, the sources 214 are terminal ends of optical cabling for directing electromagnetic radiation to the item 212 being received by the apparatus 210 from one or more sources in optical communication with such terminal ends (not shown). In some embodiments, each source 214 may be operable to produce electromagnetic radiation in selectable ranges of wavelengths.

The top wall 220 may be transparent or may include a transparent member 236 to permit the electromagnetic radiation produced by the sources 214 to transmit through the top wall 220 to impinge incident upon the item 212 being received by the apparatus 210. The transparent member 236 of the top wall 220 may be made of glass, clear plastic, plexi-glass or similar materials such that the transparent member 236 can permit electromagnetic radiation to pass through it while being of sufficient rigidity to support the item 212 when placed on the transparent member 236.

Each camera 216 preferably has a camera lens 238 directed toward the transparent member 236. FIG. 12 shows the camera lenses 238 contiguous with the bottom wall 222, although such contiguous relation is not necessary for the proper operation of the present invention. The cameras 216 may be attached to and supported by the bottom wall 222, the outer bottom wall 228, or both the bottom wall 222 and the outer bottom wall 228, for example. In some embodiments, the cameras 216 are raised from the outer bottom wall 228 by a support structure, such as the legs 239 shown in FIG. 12. In some embodiments, no support structure is required or included. In some embodiments with an outer bottom wall 228, there is no inner bottom wall 222. The apparatus 210 may include one or more filters (not shown), such as optical filters, for filtering input to the camera.

In a variation of the second embodiment, the cameras 216 and the sources 214 are located on opposing sides of the transparent member 236 such that the cameras 216 are operable to capture images from one side of the item 212 while the item 212 is being exposed from its opposite side to electromagnetic radiation produced by the sources 214.

Each camera 216 is preferably operable to produce digital representations of images, including images captured by that camera 216. It is within the scope of the present invention for each camera 216 to produce analog images, such as photographic images, which are converted by the electronic circuitry 218 to digital representations of the images. It is also within the scope of the present invention for each camera 216 to produce analog electrical or electromagnetic signals representative of images, the analog signals being converted by the electronic circuitry 218 to digital representations of the images. Each camera 216 may be operable to capture two-dimensional images, three-dimensional images, or both two-dimensional and three-dimensional images. The apparatus 210 may include a single camera 216 or a plurality of cameras 216 operable to capture the same or different types of images. In embodiments having a plurality of cameras 216, the apparatus 210 may include cameras 216 having the same or different size of camera lenses 238.

The digital representation of each image captured by the camera 216 typically includes numerical values representing image pixels of the image. The number of pixels associated with a given image of the item 212 is typically determined by parameters of the camera 216, such as resolution and angle of view, dimensions of the item 212, such as size, and dimensions of the apparatus 210, such as size of the transparent member 236 and distance between the transparent member 236 and the camera 216, for example.

In the embodiment shown in FIG. 12, each camera 216 is in electrical connection with the electronic circuitry 218 via a camera connection 240. The camera connection 240 may be suitably used to perform any and all of the functions of providing electrical power to a connected camera 216, conveying control and communication signals between the electronic circuitry 218 and the connected camera 216, and transmitting digital representations of images between the connected camera 216 and the electronic circuitry 218, for example.

The electronic circuitry 218 preferably includes a processing circuit 242, a memory circuit 244 and at least one external interface 246. The processing circuit 242 may include a microprocessor or micro-controller for digital processing, for example. The memory circuit 244 may include a read-only memory, programmable read-only memory, erasable programmable read-only memory, electrically erasable programmable read-only memory, flash type memory, or any combination thereof, for example. Preferably, at least one external interface 246 is operable to facilitate signal transmission between the electronic circuitry 218 and a communications network (not shown in FIG. 12). The communications network may include a directly connected cable connection, or a connection forming all or part of a local area network, wide area network, intranet, Internet network, or other network for electronic communications. In various embodiments of the present invention, the electronic circuitry 218 may be implemented to form a single monolithic integrated circuit (IC) or a plurality of electronic devices in association with a single circuit board, such as the circuit board 248 shown in FIG. 12, or a plurality of circuit boards 248, for example.

The processing circuit 242 may be identical to or different from the processing circuit 26 (FIG. 6) of the first embodiment and may include features analogous to corresponding features of the processing circuit 26, for example. The memory circuit 244 may be identical to or different from the memory circuit 27 (FIG. 6) of the first embodiment and may include features analogous to corresponding features of the memory circuit 27, for example. The external interface 246 may be identical to or different from the peripheral interface 28 (FIG. 6) of the first embodiment and may include features analogous to corresponding features of the peripheral interface 28, for example. Preferably, the processing circuit 242 and the memory circuit 244 are of enhanced performance relative to the processing circuit 26 (FIG. 6) and the memory circuit 27 (FIG. 6) of the first embodiment, due to greater computational requirements associated with image processing.

Figure 13:
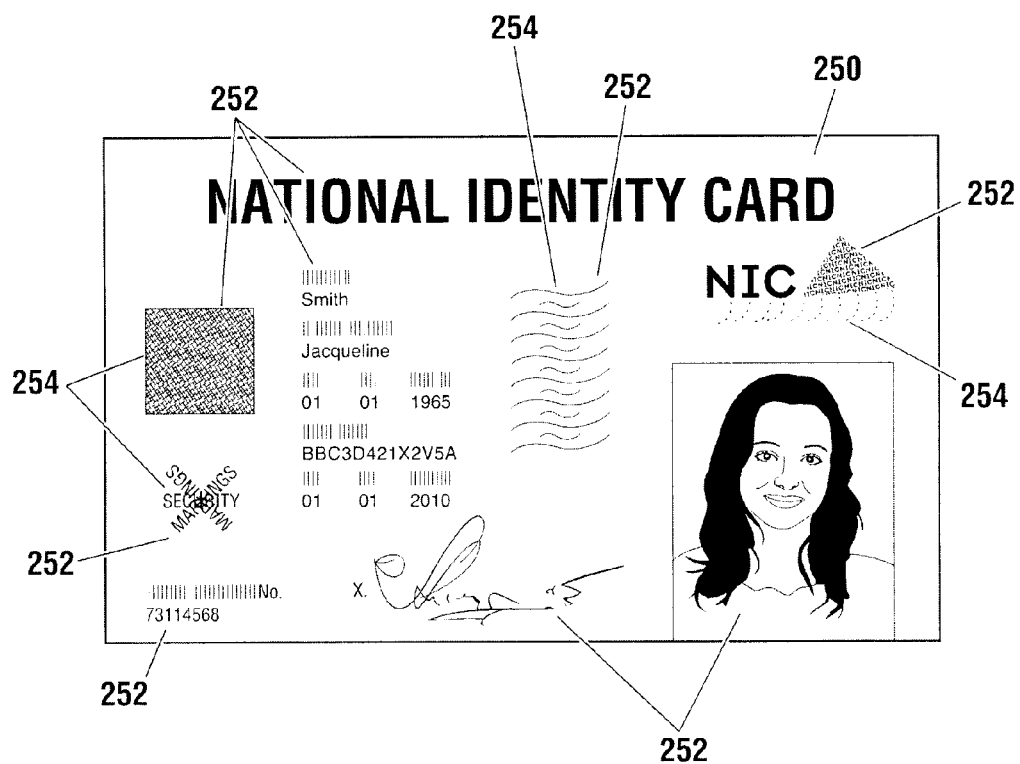
FIG. 13 is a plan view of an image of the front side of the item partly shown in FIG. 12, showing the image as having been obtained when the item was being exposed to electromagnetic radiation in the visible range of the electromagnetic spectrum.

Referring to FIG. 13, an image 250 of the front side of the item 212 (FIG. 12) obtained using the apparatus 210 while the item 212 was being exposed to electromagnetic radiation having wavelengths in the visible region of the electromagnetic spectrum includes material characteristics 252 of the item 212. An image (not shown) similar to the image 250 of the back side of the item 212 may be obtained when the item 212 is being received at its opposite side by the apparatus 210. The image 250 may be obtained when the item 250 is being exposed to white light, for example. The material characteristics 252 may include text, photographic images, drawings and other visible characteristics, including the visible aspects of any security features 254 of the item 212, for example.

Figure 14:
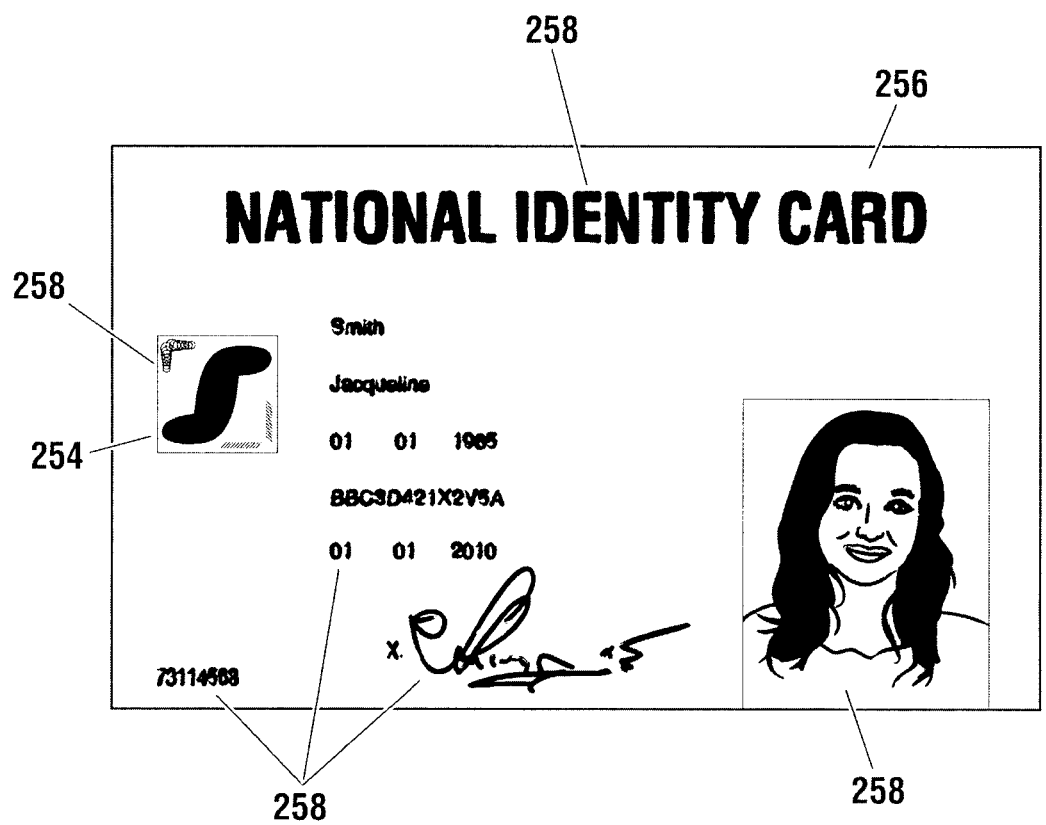
FIG. 14 is a plan view of an image of the front side of the item partly shown in FIG. 12, showing the image as having been obtained when the item was being exposed to infrared radiation.

Referring to FIG. 14, an infrared image 256 of the front side of the item 212 obtained using the apparatus 210 while the item 212 was being exposed to electromagnetic radiation having wavelengths in the infrared region of the electromagnetic spectrum includes material characteristics of the item 212 rendered imageable under infrared exposure. A backside infrared image (not shown) similar to the infrared image 256 of the back side of the item 212 may be obtained when the item 212 is being received at its opposite side by the apparatus 210. The infrared image 256 includes material characteristics which typically differ from those obtained from the image 250 obtained under visible light exposure. For example, the infrared material characteristics 258 shown in FIG. 14 differ from the material characteristics 252 of FIG. 13. At least some of the infrared material characteristics 258 may not be visible to the naked eye under ambient light conditions and thus do not appear in the image 250 of FIG. 13. The infrared material characteristics 258 may include aspects of security features 254 which are related to the thermal properties of the item 212, for example. Additionally or alternatively, the infrared material characteristics 258 may include a distribution of thermal properties of the item 212. The material characteristics 252 of FIG. 13 and the infrared material characteristics 258 of FIG. 14 may result from identical physical characteristics of the item 212 such as the text and the photograph shown in FIGS. 13 and 14.

Figure 15:
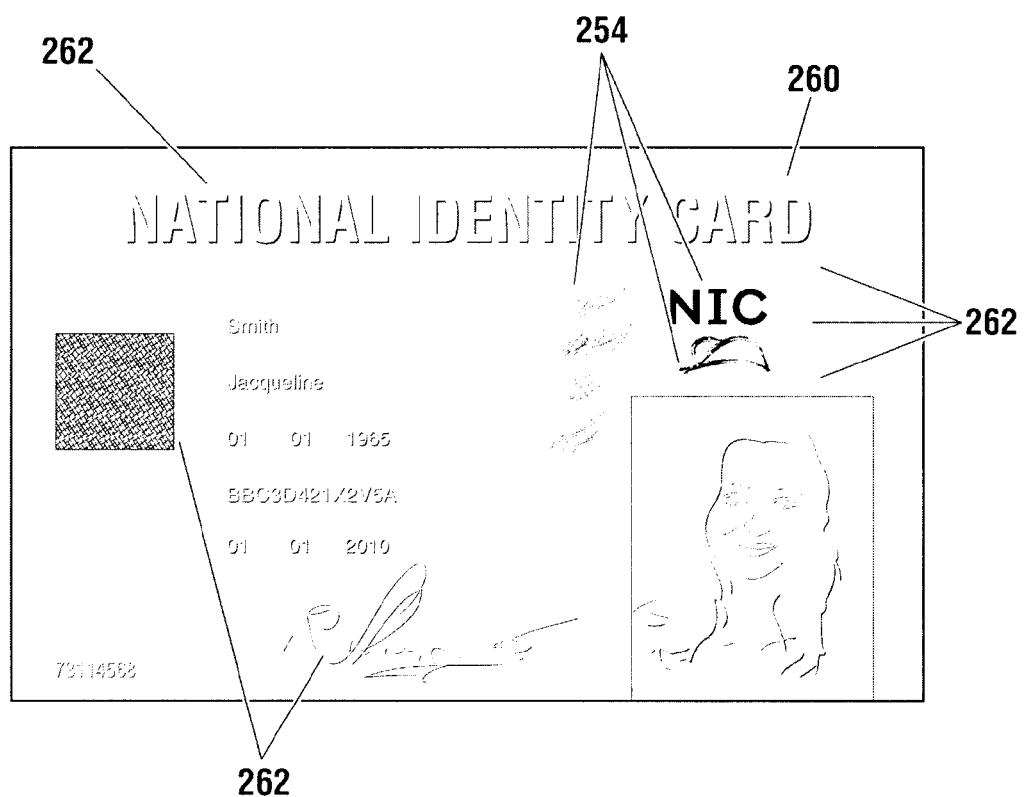
FIG. 15 is a plan view of an image of the front side of the item partly shown in FIG. 12, showing the image as having been obtained when the item was being exposed to ultraviolet radiation.

Referring to FIG. 15, an ultraviolet image 260 of the front side of the item 212 obtained using the apparatus 210 while the item 212 was being exposed to electromagnetic radiation having wavelengths in the ultraviolet region of the electromagnetic spectrum includes material characteristics of the item 212 rendered imageable under ultraviolet exposure. A backside ultraviolet image (not shown) similar to the ultraviolet image 260 of the back side of the item 212 may be obtained when the item 212 is being received at its opposite side by the apparatus 210. The ultraviolet image 260 includes material characteristics which typically differ from those obtained from the image 250 obtained under visible light exposure and from those obtained from the infrared image 256. For example, the ultraviolet image 260 shown in FIG. 15 includes the ultraviolet material characteristics 262, which may not appear in the image 250 of FIG. 13, in the infrared image 256 of FIG. 14, or not in either the image 250 of FIG. 13 nor the infrared image 256 of FIG. 14. The ultraviolet material characteristics 262 may include fluorescent security features 254 or fluorescent aspects of security features 254, for example.

Figure 16:
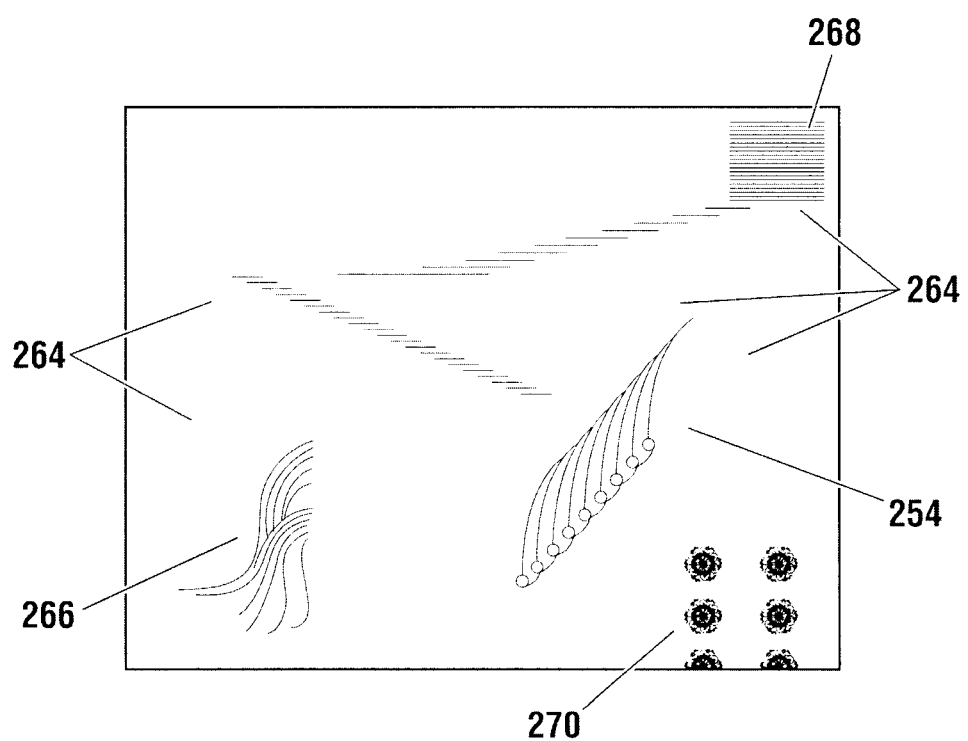
FIG. 16 is a plan view of a magnified section of an image such as any of the images shown in FIG. 13, 14 or 15.

Referring to FIG. 16, small scale material characteristics 264 require magnification to be visible to the naked human eye and may include details of the material characteristics 252 of FIG. 13, the infrared material characteristics 258 of FIG. 14, the ultraviolet material characteristics 262 of FIG. 15, and any combination thereof. Additionally or alternatively, small scale material characteristics 264 may include details of color distributions; fiber distributions; boundary features near edges of any of the material characteristics 252, 258 or 262; material characteristics related to security fibers 266; and details of the security features 254, for example.

Examples of security features 254 include security fibers 266 having a single color or multiple colors, security fibers 266 having a single or multiple fluorescent colors, security fibers 266 having a non-fluorescent color, and any combination thereof. The security feature 254 may be a security ink 268 having a single color or multiple colors, a security ink 268 having a single or multiple fluorescent colors, a security ink 268 having a non-fluorescent color, and any combination thereof, for example. As a further example, the security feature 254 may be a planchette 270 (only a portion of which is shown magnified in FIG. 16). The security feature 254 may be a portion or all of a hologram, holograph or other holography related feature. A metal or heat sensitive security fiber 266 may produce a response detectable by the camera 216 when the item is being exposed to infrared electromagnetic radiation or to a heat stimulus from the sources 214, for example. (See FIG. 14, for example.) A fluorescing security feature 254 may produce visible light capturable by the camera 216 when the item 212 is being exposed to ultraviolet radiation emitted from the sources 214. (See FIG. 15, for example.) A security fiber 266, security ink 268, planchette 270 or any combination thereof, may fluoresce with a specific color, including fluorescing with a color in the visible light range selected to identify a particular individual, organization, or type associated with the item 212, for example.

By way of further examples, the security feature 254 may be inherent to the item 212, such as in the case of natural imperfections occurring incidentally as a result of manufacturing the item 212, or be deliberately introduced or applied to the item 212 before, during or after manufacturing of the item 212. A security feature 254 may be applied before manufacturing the item 212 by blending the security feature 254 into a raw material from which the item 212 is then manufactured, for example. The security feature 254 may be added to the outer surface, or a portion thereof, of the item 212 or, additionally or alternatively, be embedded at a depth within the item 212. The security feature 254 may be distributed randomly on or within the item 212, whether inherently resulting from the manufacturing of the item 212 or deliberately arranged in a random distribution.

The security feature 254 may be identical to or different from the security feature 60 (FIGS. 2 and 3) and may include features analogous to corresponding features of the security feature 60, for example.

Figure 20:
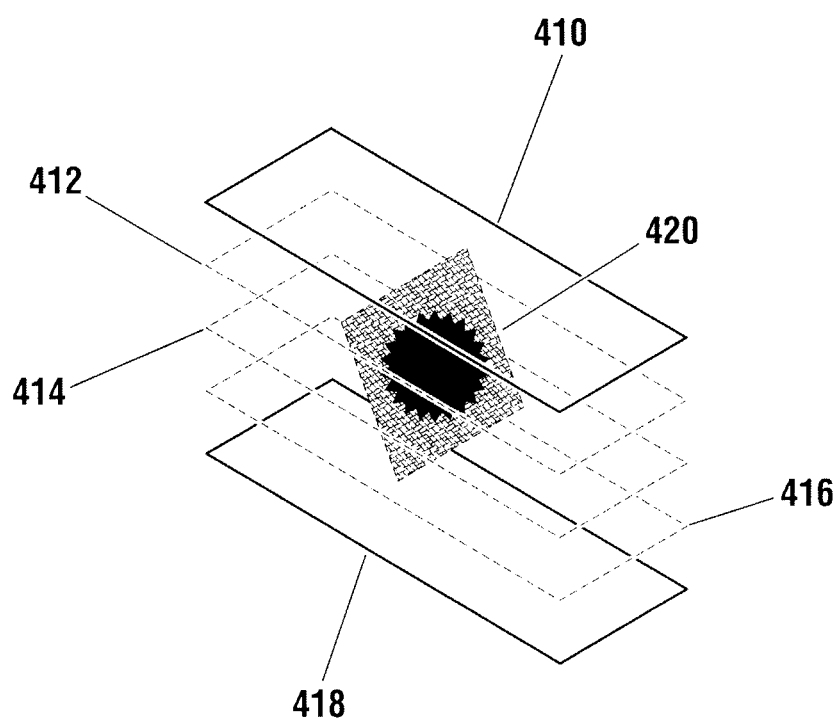
FIG. 20 is a perspective view of a virtual security feature super imposed on a value item.

Referring to FIG. 20, in an alternative embodiment of the invention, a virtual security feature or features 420 may be added, blended, mixed or replaced to a record or layer of one or more image layers 410, 412, 414, 416, 418 of a representation of a value item. There could be more than five layers and in fact there could be any number of layers depending on the application and the level of security desired. There could be one or more of virtual security features added to one or to the multi layers of the respected layers of FIG. 20. Such a virtual security feature or features (1 to any number required for solution to one or any number of layers) such as feature 420 may be inserted, mounted, blended, mixed both at the pixel or composition layers, installed, cross sectional or attached to one or more image layer of a document. For example, one or multiples of virtual security features of any combination such as feature 420 may be inserted between one or more image layers of a value item, or on top of a top image layer 410 of a value item as an overlay, or under a bottom image layer 418 of a value item as an underlay. Alternatively, a virtual security feature or many security features such as feature 420 may be inserted through one or more image layers of a value item, oriented at an angle from 0 to 180 degrees on either X, Y or Z axis or combination of X, Y and Z axes with time, date and location both physical and virtual as a fourth dimension added or included into this virtual security features at the same time in any angle or form to the one or more layers, as a cross sectional virtual security feature insert. Further, one or more such examples of a virtual security feature in combination of X, Y, Z and time, date and place may be combined to create a unique characteristic of the representation of a value item 100. The virtual security features could be in single, or multi-color, shape, form, or blend of different characteristics as it is or with time, date and location formulated, integrated and/or blended into the unique characteristics. Thus the virtual security feature 420 may consist of an electronic record of phantom physical characteristic which is unique to the particular value item 100, or it may simply be a digital signature.

A virtual security feature 420 may be adapted to replace, supplement or resemble one or more physical security features which may be added to security and value items, such as: fibres; powders of different kinds and colours excitable under one or more different light spectra in the define and available range of available light spectrum from visible, Ultra Violate, Infrared, Near Infrared, Laser, X-Ray or any available light source of any available frequencies in optics and science or other physical or chemical environments or elements such as heat, radio frequency, magnetic fields; holograms or metallic strips; watermarks; ghost images; security threads of any kind and shape having writing or magnetic characteristics including solid or dashed threads; transparent material; planchette or microprinting and fine lines.

A virtual security feature 420 may be used with one or more image layer representations from a physical value item of any suitable type, including value items comprising any organic, synthetic materials or combination and mixture of organic and synthetic. Further a virtual security feature 420 may be added at any one or more points in the life cycle of a value item, material or document, including addition during any of the following exemplary processes: raw material both for organic or synthetics, manufacturing of raw materials for the value item, manufacturing or production of final value item products, issuance of a value item, registration of a value item including production, printing, drawing, painting, heat sealing, using glue of any kind or type to join make the product, lamination of any kind, using of different inks (mono color or multi color), inks with different chemical and physical characteristics and compositions, ink with mixture or composition of material such as organic and/or synthetic fiber, IR material, RF, or any compound that excites under light of any source and range, or stimulates with natural phenomena such as magnetic field and radio frequency and storage of image layers, and verification of a value item. The virtual security feature 420 is compared in the retrieval and comparison steps for verification as with other security features and images described herein.

Referring back to FIG. 12, the electronic circuitry 218 is preferably operable to produce a material profile associated with the item 212 from the digital representation of the image 250 of FIG. 13, the infrared image 256 of FIG. 14, the ultraviolet image 260 of FIG. 15, or any combination thereof.

The material profile associated with a given item 212 is typically implemented as a sequence of numerical values representing one or more images of that given item 212. Additionally or alternatively, the material profile associated with the given item 212 may include calculated quantities associated with the given item 212. Such quantities may include the size, shape, location, color, shade, time, date and any combination or distribution thereof, of imageable features, for example.

The electronic circuitry 218 is preferably operable to produce the material profile by digital processing.

Figure 17:
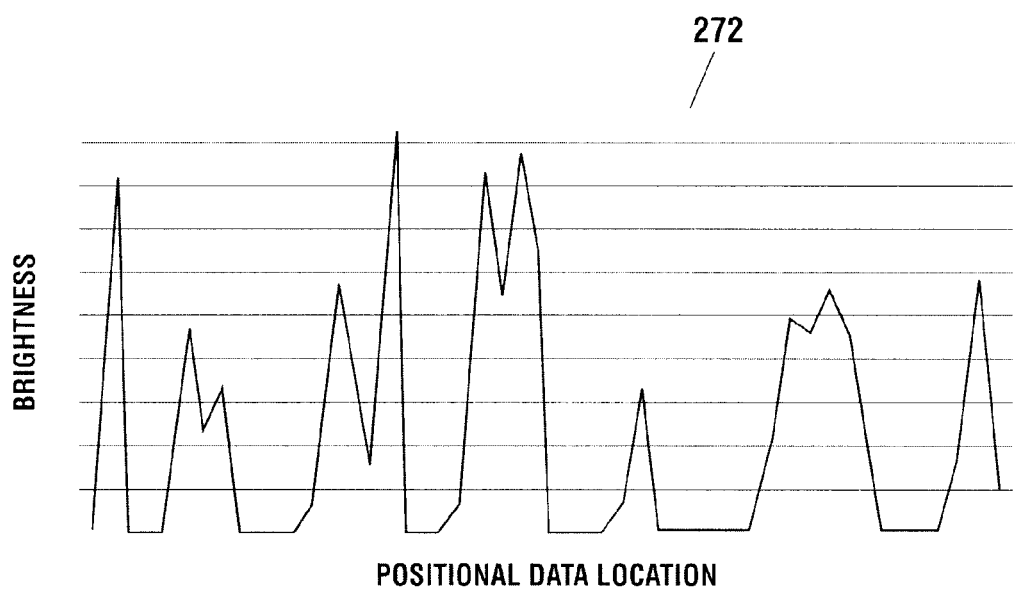
FIG. 17 is a graphical representation of an exemplary material profile of the item partly shown in FIG. 12.

FIG. 17 graphically illustrates an exemplary material profile 272 in which the horizontal axis labeled "positional data location" represents a linear distance along the item 212 (FIG. 12) in a specifiable direction and the vertical axis labeled "brightness" represents the imageable brightness or optical intensity of the item 212 along that specifiable direction. As a further example, the vertical axis may represent the optical intensity of visible light emitted by fluorescing security feature 254 (FIG. 15) of the item 212 under ultraviolet exposure, for example. Other quantities associated with or calculated from a given material profile are susceptible of graphical illustration.

Method of Operation of the Second Embodiment

Figure 18:
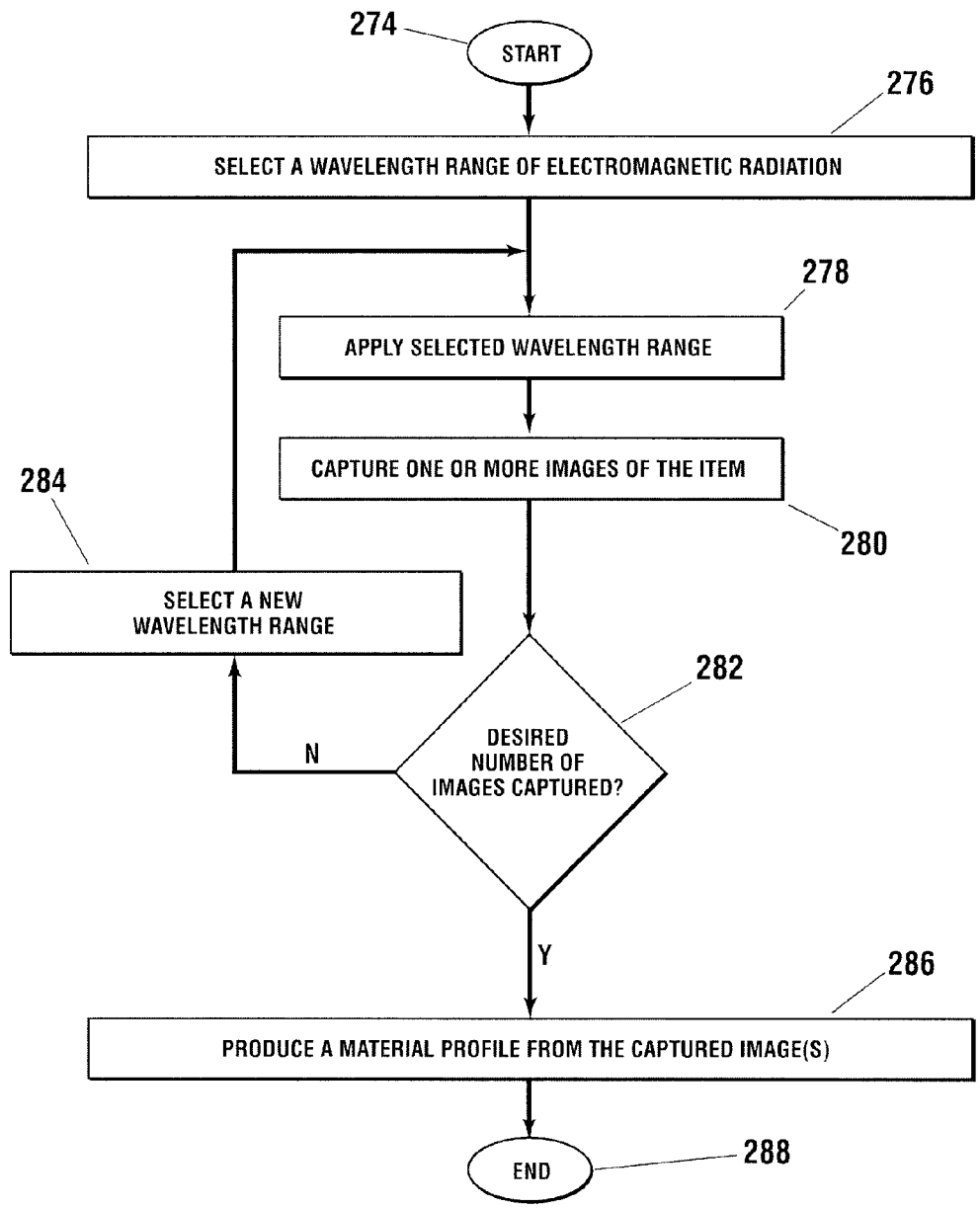
FIG. 18 is a flow diagram of a process of creating a material profile in accordance with the second embodiment of the invention.

In the second embodiment and with reference to FIG. 18, the memory circuit 244 (FIG. 1) contains blocks of code for directing the processing circuit 242 (FIG. 1) to perform a process, shown generally at 274, of creating a material profile. The process of FIG. 18 is typically performed on a given item 212 before the given item 212 is issued for general use.

When a given item 212 is received by the apparatus 210, block 276 directs the processing circuit 242 to select a wavelength range of electromagnetic radiation, which is typically a range of wavelengths of electromagnetic radiation for which at least one source 214 is operable to produce. The wavelength range selected by the processing circuit 242 may be a user programmable operating parameter of the apparatus 210, for example.

Block 278 then directs the processing circuit 242 to cause the apparatus 210 to apply the selected wavelength range. Applying the selected wavelength range typically involves activating one or more applicable sources 214 such that the selected wavelength range of electromagnetic radiation is produced by the activated sources 214. Applying the selected wavelength range may involve activating a plurality of sources 214 producing electromagnetic radiation having the same or different wavelengths from each other. In typical operation, the given item 212 is exposed to the electromagnetic radiation being produced by the activated sources 214.

Block 280 then directs the processing circuit 242 to cause the apparatus 210 to capture one or more images of the given item 212 while the selected wavelength range is being applied. The number of images captured at each selected wavelength range may be a user programmable operating parameter of the apparatus 210, for example. Capturing an image may involve capturing the image of a specifiable portion of the item 212. Capturing an image may involve producing a digital representation of the captured image of the item 212. Capturing an image may involve transmitting the digital representation from one or more cameras 216 to the processing circuit 242, which may be transmitted via associated camera connections 240.

Block 282 then directs the processing circuit 242 to determine whether the desired number of images have been captured. The desired number of images to capture may be a user programmable operating parameter, for example. Additionally or alternatively, the number of images to be captured may be determined in accordance with a standard associated with the material profile being created by the process 274, or with a type of the material profile being created.

If executing block 282 results in the determination that the desired number of images has not been captured, then block 282 directs the processing circuit 242 to execute block 284.

Block 284 directs the processing circuit 242 to select a new wavelength range. The newly selected wavelength range is typically different from any wavelength range previously selected during the execution of the process 274, although it is within the scope of the present invention to repeatedly apply identical wavelength ranges during a single execution of the process 274. Such repetition may involve redundant processing for accuracy verification, for example. The order in which wavelength ranges are selected by the processing circuit 242 may be a user programmable operating parameter of the apparatus 210, for example. In typical operation, the wavelength range or ranges selected and the order in which the wavelength ranges are selected is determined on the basis of security features 254 known to be incorporated into the item 212. The apparatus 210 is preferably operable to be configurable for use with a variety of different items 212 having different security features 254 associated therewith and with a variety of different types of items 212. After block 284 is executed, the process 274 proceeds to execute block 278.

If executing block 282 results in the determination that the desired number of images has been captured, then block 282 directs the processing circuit 242 to execute block 286.

Block 286 directs the processing circuit 242 to produce a material profile from the images captured during the execution(s) of block 280.

Figure 19:
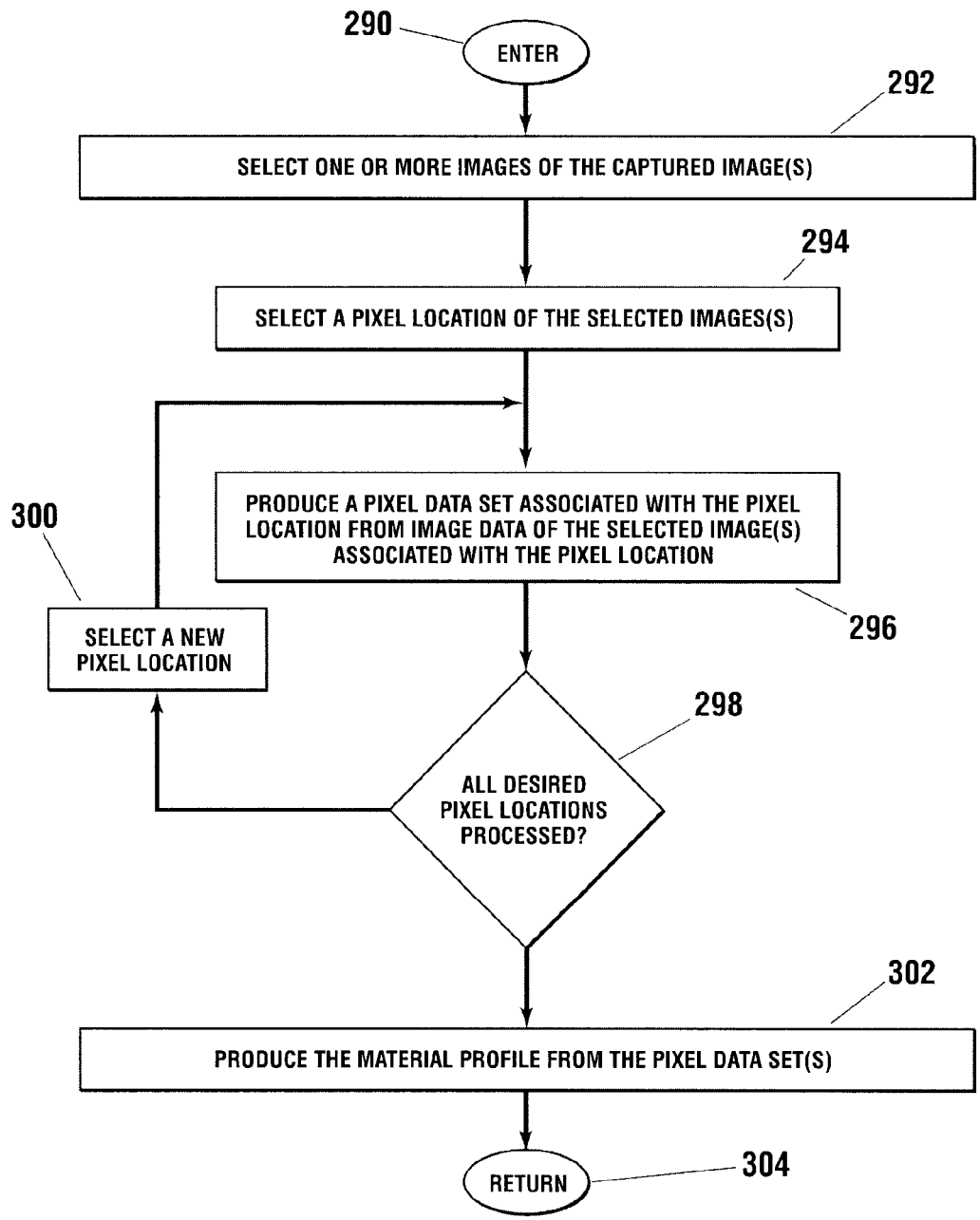
FIG. 19 is a flow diagram of a process for the step of producing the material profile from captured images shown in the flow diagram of FIG. 18.

Referring to FIG. 19, a method of producing the material profile from the images captured during the execution(s) of block 280 (FIG. 18) is shown generally at 290.

Block 292 directs the processing circuit 242 to select one or more of the images captured during the execution(s) of block 280 (FIG. 18). The number of images selected and criteria for selecting the images may be a user programmable operating parameter of the apparatus 210, for example, and may include selecting all of the captured images.

Block 294 then directs the processing circuit 242 to select a pixel location of the selected images. Pixel locations typically correspond to two-dimensional coordinates associated with the images. By way of example, a given set of m×n pixel locations, where m is the width of the selected images measured in units of pixel width and n is the length of the selected images measured in units of pixel length, includes pixel locations (1,1), (1,2), (1,3), . . . (1,n); (2,1), (2,2), . . . (2,n); . . . (m,1), (m,2), . . . (m,n). The first selected pixel location may be pixel location (1,1), for example. Typically, one image pixel of the image is located at each pixel location.

Block 296 then directs the processing circuit 242 to produce a pixel data set associated with the currently selected pixel location from pixel image data associated with the pixels corresponding to the currently selected pixel location of all of the selected images. For example, the image data for the pixels located at (1,1) from all of the selected images may be used to produce a pixel data set (1,1) associated with the pixel location (1,1). Producing the pixel data set may involve storing a produced pixel data set, including storing the produced pixel data set in the memory circuit 244 (FIG. 12).

Block 298 then directs the processing circuit 242 to determine whether processing has occurred in respect of all desired pixel locations. The number of pixel locations selected for processing, which pixel locations are selected for processing, and the order in which selected pixel locations are processed may be respective user programmable operating parameters of the apparatus 210, for example. Thus, the apparatus 210 may be configured to produce one pixel data set for each and every pixel location of the selected images. Additionally or alternatively, the pixel locations of one or more specifiable sub-sections only of the selected images may be selected for processing.

If executing block 298 results in the determination that processing has not occurred in respect of all desired pixel locations, then block 298 directs the processing circuit 242 to execute block 300.

Block 300 directs the processing circuit 242 to select a new pixel location. The newly selected pixel location is typically different from any pixel location previously selected during the execution of the process 290, although it is within the scope of the present invention to repeatedly produce pixel data sets associated with identical pixel locations during a single execution of the process 290. Such repetition may involve redundant processing for accuracy verification, for example. The pixel location selected after pixel location (1,1) has been processed may be pixel location (1,2), for example. After block 300 is executed, the process 290 proceeds to execute block 296 again in respect of the newly selected pixel location.

If executing block 298 results in the determination that sufficient processing has occurred in respect of all desired pixel locations, then block 298 directs the processing circuit 242 to execute block 302.

Block 302 directs the processing circuit 242 to produce the material profile from the pixel data sets previously produced by block 296. The material profile may be produced by digital processing of the pixel data sets, including combining pixel data from the pixel data sets for example. Producing the material profile may involve retrieving stored pixel data sets from memory, including retrieving stored pixel data sets from the memory circuit 244 (FIG. 12).

When block 302 has been executed, the process 290 proceeds to block 304 which directs the processing circuit 242 to complete the process 290 and return to block 286 (FIG. 18).

Referring back to FIG. 18 at block 286, additionally or alternatively to the process 290 (FIG. 19), producing the material profile may involve digital processing steps such as normalization, signal processing to improve a signal-to-noise ratio or other filtering effects, concatenation, data reduction, data compression, correction processing such as age, use or other correction processing, data truncation, data encryption, and any combination thereof. In some embodiments, one image captured while executing block 280 may be used to apply a correction to another captured image, including applying a correction associated with age-related features of the item 212 such as color or shading, use-related features of the item 212 such as the presence of dirt or grease marks, and/or other features of the item 212. The process for applying the correction is preferably analogous to the process 140 (FIG. 11) with necessary modifications being made as may be understood by the person of ordinary skill in the art upon consideration of the disclosure herein.

Producing the material profile may involve storing a produced material profile as a stored material profile. The material profile may be stored in an electronic storage medium of the item 212, including an electronic storage medium similar to the electronic storage medium 108 of the value item 100. Additionally or alternatively, the apparatus 210 may store the material profile in a storage medium external to the item 212, such as the memory circuit 244 (FIG. 12), or an external database similar or analogous to the external database 50 (FIGS. 6 and 8).

Upon completion of the execution of block 286, block 288 directs the processing circuit 242 to end the process 274.

The material profile is preferably reproducibly produced such that obtaining the material profile of a given item 212 multiple times, including multiple times by different instances of the apparatus 210 at different locations, produces material profiles that are substantially equivalent to the extent that the item 212 has not been defaced, adulterated, modified, aged through natural processes and/or use, or otherwise changed.

In cases where the given item 212 includes an electronic storage medium, such as the electronic storage medium 108 of the value item 100, having stored therein information associated with the given item 212 and the apparatus 210 is operable to permit or deny access to the associated information, the apparatus 210 may be suitably used to permit or deny such access based on a comparison between a subsequently obtained material profile of a subsequently presented item 212 and the stored material profile of the given item 212. The process for permitting or denying access to the associated information is preferably analogous to the process 120 (FIG. 10) with necessary modifications being made as may be understood by the person of ordinary skill in the art upon consideration of the disclosure herein.

As will be apparent to those skilled in the art, in the light of the foregoing disclosure, many alterations and modifications are possible in the practice of this invention without departing from the spirit or scope thereof. For example, an apparatus, or components thereof, for accessing information associated with an item may be included in or implemented separately from the apparatus described herein for detecting the item. Accordingly, the scope of the invention is to be construed in accordance with the substance defined by the following claims.

DRAWING LEGEND 10 scanner
12 main circuit board
14 track
16 sensor circuit board
18 conditioning electronic circuit
20 substrate
22 analog-to-digital converter
24 processor
26 processing circuit 27 memory circuit
28 peripheral interface
29 motion control unit
30 source
32 source matrix
40 sensor
42 sensor matrix
44 infrared sensor
50 external database
60 security feature
62 security fibers
64 security ink
66 planchette
80 scanning path
82 narrow scanning path
84 wide scanning path
90 personal computer
92 local area network server
94 Internet link
97 processing centre
99 data writer
100 value item
102 first portion (of substrate 20)
104 second portion (of substrate 20)
106 machine readable zone
107 markings
108 electronic storage medium
110-116 process and blocks of code of FIG. 9
120-132 process and blocks of code of FIG. 10
140-152 process and blocks of code of FIG. 11
210 apparatus according to second embodiment
212 item
214 sources
216 camera
218 electronic circuitry
220 top wall
222 bottom wall
224 side wall
226 outer side wall
228 outer bottom wall
230 source support
232 source lens
234 source connection
236 transparent member
238 camera lens
239 legs
240 camera connection
242 processing circuit
244 memory circuit
246 external interface
248 circuit board
250 front side image
252 material characteristic
254 security feature
256 infrared image
258 infrared material characteristics
260 ultraviolet image
262 ultraviolet material characteristics
264 small scale material characteristics
266 security fibers
268 security ink
270 planchette
272 material profile
274-288 process and blocks of code of FIG. 18
290-304 process and blocks of code of FIG. 19
410-418 image layers
420 virtual security feature

What is claimed is:

1. An apparatus for detecting an item having a substrate, the apparatus comprising:
   a) a housing comprising a support plate operable to support the item, said housing further comprising a bottom wall, said bottom wall being substantially parallel to and spaced apart from said support plate;
   b) one or more sources operable to produce electromagnetic radiation having a wavelength in a range of the electromagnetic spectrum, said one or more sources being oriented to direct said electromagnetic radiation toward said support plate from one or more side walls of said housing, said one or more side walls extending at least partway between said support plate and said bottom wall; and
   c) at least one imaging device operable to produce an image of the item, said at least one imaging device comprising a three-dimensional camera operable to produce three-dimensional images of the item, said three-dimensional camera being supported by said bottom wall so as to have an angle of view directed toward at least an area of said support plate,
wherein the apparatus is operable to produce from said image a material profile associated with the item, said material profile comprising a digital representation of small scale material characteristics rendered imageable by the item being exposed to said electromagnetic radiation, said small scale material characteristics comprising details of one or more of an infrared material characteristic, a visible light material characteristic and an ultraviolet material characteristic, said details requiring magnification to be visible to the human eye, said small scale material characteristics comprising first and second security features of the item, said first security feature being deliberately introduced into the substrate, said second security feature being inherent to the substrate.

2. The apparatus of claim 1, wherein said small scale material characteristics comprise said details of all of said infrared material characteristic, said visible light material characteristic, and said ultraviolet material characteristic.

3. The apparatus of claim 2 further comprising a heater and wherein said infrared material characteristic comprises a distribution of thermal properties associated with the item.

4. The apparatus of claim 2 wherein said ultraviolet material characteristic comprises a fluorescent security feature of the item.

5. The apparatus of claim 1 wherein said material profile comprises a virtual security feature.

6. The apparatus of claim 1 wherein said material profile comprises a calculated quantity selected from the group consisting of:
   size, shape, location, color, shade, time, date and a distribution of one or more imageable features.

7. The apparatus of claim 1 comprising a plurality of said sources operable to produce electromagnetic radiation having a plurality of wavelengths in a plurality of ranges of the electromagnetic spectrum, respectively.

8. The apparatus of claim 1 wherein said housing comprises a top wall and wherein said support plate is attached to said housing intermediate said top wall and said bottom wall.

9. The apparatus of claim 1 comprising a processor operable to control said at least one imaging device and said one or more sources such that a plurality of said images are sequentially produced in response to the item being sequentially exposed to a plurality of instances of electromagnetic radiation having a plurality of wavelengths in a plurality of ranges of the electromagnetic spectrum, respectively.

10. The apparatus of claim 9 wherein said processor is operable to produce said material profile, and wherein said processor is operable to store said material profile in a memory of the apparatus.

11. The apparatus of claim 10 wherein said processor is operable to compare said material profile with a stored material profile, permit access to information associated with the item if said material profile matches said stored material profile, and deny access to information associated with the item if said material profile does not match said stored material profile.

12. The apparatus of claim 7 wherein said plurality of sources are oriented to direct said electromagnetic radiation toward said support plate from all of said one or more side walls.

13. The apparatus of claim 1 wherein the apparatus comprises one or more filters for filtering input to said at least one imaging device.

14. The apparatus of claim 1 wherein said at least one imaging device and said one or more sources are located on a same side of said support plate, said at least one imaging device comprising a plurality of said three-dimensional cameras respectively oriented toward said support plate.

15. A method of detecting an item having a substrate, the method comprising:
   a) producing, by one or more sources attached to a housing which comprises a support plate operable to support the item, a bottom wall substantially parallel to and spaced apart from said support plate, and one or more side walls extending at least partway between said support plate and said bottom wall, electromagnetic radiation having a wavelength in a range of the electromagnetic spectrum and directed toward said support plate from said one or more side walls;
   b) producing, by an imaging device comprising a three-dimensional camera which is operable to produce three-dimensional images of the item and is supported by said bottom wall so as to have an angle of view directed toward at least an area of said support plate, a three-dimensional image of the item; and
   c) producing from said three-dimensional image a material profile associated with the item and comprising a digital representation of small scale material characteristics rendered imageable by the item being exposed to said electromagnetic radiation, said material profile being produced in response to said small scale material characteristics comprising details of one or more of an infrared material characteristic, a visible light material characteristic and an ultraviolet material characteristic, said details requiring magnification to be visible to the human eye, said small scale material characteristics comprising first and second security features of the item, said first security feature being deliberately introduced into the substrate, said second security feature being inherent to the substrate.

16. The method of claim 15 wherein the step of producing said electromagnetic radiation comprises selecting said range from the group consisting of: infrared, visible light and ultraviolet.

17. The method of claim 15 wherein the step of producing said material profile comprises producing said material profile comprising said digital representation of said small scale material characteristics comprising said details of all of said infrared material characteristic, said visible characteristic, and said ultraviolet material characteristic.

18. The method of claim 15 wherein the step of producing said material profile comprises producing a virtual security feature.

19. The method of claim 15 wherein the step of producing said material profile comprises producing a calculated quantity associated with the item and selected from the group consisting of: size, shape, location, color, shade, time, date and a distribution of one or more imageable features.

20. The method of claim 15 further comprising filtering an input to said imaging device.

21. The method of claim 15 further comprising transmitting said material profile.

22. The method of claim 15 further comprising comparing said material profile with a stored material profile and permitting access to information associated with the item only if said material profile matches said stored material profile.

23. The method of claim 15 wherein the step of producing said material profile comprises producing said material profile from a plurality of said three-dimensional images produced by said imaging device in response to said one or more sources producing electromagnetic radiation having a plurality of wavelengths in a plurality of ranges of the electromagnetic spectrum, respectively.

24. The method of claim 23 comprising selecting each of said plurality of ranges of the electromagnetic spectrum in accordance with a user programmable operating parameter.

25. The method of claim 23 wherein producing said material profile from a plurality of said three-dimensional images produced by said imaging device in response to said one or more sources producing electromagnetic radiation having a plurality of wavelengths in a plurality of ranges of the electromagnetic spectrum, respectively, comprises producing first and second images and correcting said first image in response to said second image in respect of at least one of age and use.

26. The method of claim 23 wherein producing said material profile from a plurality of said three-dimensional images produced by said imaging device in response to said one or more sources producing electromagnetic radiation having a plurality of wavelengths in a plurality of ranges of the electromagnetic spectrum, respectively, comprises producing a pixel data set comprising respective pixel image data associated with a pixel location of said plurality of three-dimensional images, and producing said material profile in response to one or more of said pixel data sets associated with respective said pixel locations.

* * * * *